United States Patent
Taguchi

(10) Patent No.: US 10,548,266 B2
(45) Date of Patent: Feb. 4, 2020

(54) BINDING MACHINE FOR GARDENING

(71) Applicant: MAX CO., LTD., Chuo-ku, Tokyo (JP)

(72) Inventor: Satoshi Taguchi, Tokyo (JP)

(73) Assignee: MAX CO., LTD., Tokyo (JP)

( * ) Notice: Subject to any disclaimer, the term of this patent is extended or adjusted under 35 U.S.C. 154(b) by 235 days.

(21) Appl. No.: 15/622,253

(22) Filed: Jun. 14, 2017

(65) Prior Publication Data

US 2017/0359973 A1 Dec. 21, 2017

(30) Foreign Application Priority Data

Jun. 15, 2016 (JP) .................................. 2016-119282

(51) Int. Cl.
*B65B 13/02* (2006.01)
*B65B 13/16* (2006.01)
(Continued)

(52) U.S. Cl.
CPC .............. *A01G 17/085* (2013.01); *A01B 1/00* (2013.01); *B65B 13/025* (2013.01); *B65B 13/16* (2013.01);
(Continued)

(58) Field of Classification Search
CPC ... B65B 13/183; B65B 13/345; B65B 13/327; B65B 13/185; B65B 13/16; B65B 13/20;
(Continued)

(56) References Cited

U.S. PATENT DOCUMENTS 3,438,833 A * 4/1969 Nakano ............... B29C 66/1122
100/33 PB
6,382,289 B1 * 5/2002 Jho ....................... A01G 17/085
100/16
(Continued)

FOREIGN PATENT DOCUMENTS

DE        A1-2316215       10/1974
EP        A1-0567710       4/1992
(Continued)

OTHER PUBLICATIONS

Communication dated Aug. 13, 2018 in corresponding European Patent Application No. 17 175 973.1 (5 pages).
(Continued)

*Primary Examiner* — Jimmy T Nguyen
(74) *Attorney, Agent, or Firm* — Rothwell, Figg, Ernst & Manbeck, P.C.

(57) ABSTRACT

A binding machine for gardening includes a main handle to draw out a tape, a clincher arm rotatably attached to the main handle, and a tape gripping device attached to the clincher arm. When the clincher arm rotates in a closing direction to a predetermined position with respect to the main handle, a gripping operation is performed in which the tape gripping device grips the tape. When the clincher arm further rotates in the closing direction from the predetermined position with respect to the main handle to be in a closed state, a binding operation is performed to bind objects. The gripping operation and the binding operation are performed alternately. The movement restricting unit is provided to restrict the rotation of the clincher arm in the closing direction from the predetermined position at the time of the gripping operation.

12 Claims, 21 Drawing Sheets

(51) Int. Cl.
*B65B 13/18* (2006.01)
*B65B 13/20* (2006.01)
*B65B 13/34* (2006.01)
*A01G 17/08* (2006.01)
*A01B 1/00* (2006.01)

(52) U.S. Cl.
CPC ............ *B65B 13/185* (2013.01); *B65B 13/20* (2013.01); *B65B 13/345* (2013.01)

(58) Field of Classification Search
CPC ........ A01G 17/08; A01G 17/085; A01G 5/02; A01B 1/00
USPC .............. 100/6, 16, 33 PB, 33 R; 47/1.01 R, 47/1.01 S
See application file for complete search history.

(56) References Cited

U.S. PATENT DOCUMENTS

| | | | |
|---|---|---|---|
| 6,968,988 B2 * | 11/2005 | Hayashi | ............... A01G 17/085 227/108 |
| 2004/0237805 A1 | 12/2004 | Hayashi et al. | |
| 2005/0028497 A1 | 2/2005 | Hayashi et al. | |
| 2008/0104886 A1 * | 5/2008 | Nakamura | ........... A01G 17/085 47/1.01 S |
| 2013/0125461 A1 * | 5/2013 | Seo | ........................ A01G 17/08 47/1.01 S |
| 2015/0181810 A1 | 7/2015 | Cho | |

FOREIGN PATENT DOCUMENTS

| | | |
|---|---|---|
| EP | A1-2664233 | 11/2013 |
| EP | A1-2926649 | 10/2015 |
| JP | 2003-020005 A | 1/2003 |
| JP | 2003-23881 A | 1/2003 |
| JP | A-2008-072928 | 4/2008 |
| KR | 10-1102888 B1 | 1/2012 |
| SU | 686679 A1 | 9/1979 |

OTHER PUBLICATIONS

Extended European Search Report dated Nov. 8, 2017 in corresponding European patent application 17175973.1 (8 pages).

* cited by examiner

BINDING MACHINE FOR GARDENING

CROSS-REFERENCE TO RELATED APPLICATION

This application is based on and claims priority under 35 USC119 from Japanese Patent Application No. P2016-119282 filed on Jun. 15, 2016.

TECHNICAL FIELD

The present invention relates to a binding machine for gardening that is used for guiding/binding work in agricultural crop cultivation.

BACKGROUND

In the related art, a binding machine for gardening is used for guiding/binding work at the time of cultivation of agricultural crops. Specifically, the binding machine for gardening is used to bind plant vines and stems to poles or nets in cultivation of agricultural crops such as cucumbers, grapes, or tomatoes.

For example, as illustrated in JP-A-2003-23881, this type of binding machine for gardening includes a main handle capable of drawing out a tape from a front end portion and a clincher arm rotatable with respect to the main handle. When an operation handle of the binding machine for gardening is lightly gripped, the clincher arm rotates in a closing direction with respect to the main handle, and a tape gripping device provided at a front end portion of the clincher arm grips the tape drawn out from the front end portion of the main handle. When the squeezing of the handle is released in this state, the clincher arm rotates in an opening direction with respect to the main handle, and the tape is drawn out. When the tape is drawn out and the tape is stretched between the clincher arm and the main handle, the agricultural crops and poles are pressed against the drawn-out tape, and the agricultural crops and the poles are inserted between the clincher arm and the main handle. When the handle is further gripped again in this state, the clincher arm rotates in the closing direction with respect to the main handle, and a tape loop is formed. When the handle is further gripped, both ends of the tape loop are bound by a staple, the ends of the tape loop are cut by a cutter, and thus the binding is completed.

SUMMARY

As described above, in such a binding machine for gardening, the tape is drawn out by the tape gripping device in the first squeezing operation, the staple is ejected and the tape is cut in the second squeezing operation, and the binding operation is performed by alternately performing the first squeezing operation and the second squeezing operation. At this time, at the time of the first squeezing operation, it is necessary to shallowly grip the handle without squeezing it to the end.

However, there is a problem that an unfamiliar worker for the binding machine for gardening does not know how much to grip the handle at the time of the first squeezing operation. Therefore, there is a disadvantage that the tape gripping operation is not executed due to the shallow squeezing or the tape gripped once by the tape gripping device is released due to the excessive squeezing, whereby the staple is idly ejected.

Therefore, the invention is to provide a binding machine for gardening capable of preventing defective drawing-out of a tape even when an unfamiliar worker operates the binding machine for gardening.

The invention has been made to solve the problems, and is characterized by the following.

(1) A binding machine for gardening comprising:
a main handle that is configured to draw out a tape from a front end portion thereof;
a clincher arm that is rotatably attached to the main handle; and
a tape gripping device that is attached to a front end portion of the clincher arm, wherein
when the clincher arm rotates in a closing direction to a predetermined position with respect to the main handle, a gripping operation is performed in which the tape gripping device grips an end portion of the tape drawn out from the front end portion of the main handle,
when the clincher arm further rotates in the closing direction from the predetermined position with respect to the main handle to be in a closed state, a binding operation is performed in which the tape binds objects to be bound and is then cut,
the gripping operation and the binding operation are performed alternately, to bind the object, and
a movement restricting unit is provided to restrict the rotation of the clincher arm in the closing direction from the predetermined position at the time of the gripping operation.

(2) The binding machine for gardening according to (1), wherein
the movement restricting unit is movably provided to interact with the tape gripping device, and is configured to switch whether or not to restrict the rotation of the clincher arm, by the movement of the movement restricting unit.

(3) The binding machine for gardening according to (1) or (2), further comprising:
a tape guide through which the tape is guided so as to be drawable, at the front end portion of the main handle, wherein
the tape guide is configured to restrict the rotation of the clincher arm as the movement restricting unit.

(4) The binding machine for gardening according to any one of (1) to (3), wherein
the movement restricting unit is configured to restrict the rotation of the clincher arm when the tape gripping device is in a standby state, and is configured not to restrict the rotation of the clincher arm when the tape gripping device is in a gripping state.

(5) The binding machine for gardening according to any one of (1) to (4), wherein
the gripping operation is performed during a first closing rotation of the clincher arm and the binding operation is performed during a second closing rotation of the clincher arm, and
the movement restricting unit is configured to restrict the rotation of the clincher arm after the tape gripping device grips the end portion of the tape during the first closing rotation.

According to the above (1), the movement restricting unit is provided to restrict the rotation of the clincher arm in the closing direction from the predetermined position at the time of the gripping operation. According to this configuration, since the movement restricting unit controls such that the handle is excessively gripped at the time of the first squeezing operation of drawing out the tape, it is possible to avoid the problem that the tape cannot be successfully gripped due to the excessive squeezing or the insufficient squeezing of the handle. Accordingly, the unfamiliar worker for the binding machine for gardening can also determine the extent to which the handle is gripped in the tape gripping operation. Meanwhile, since the movement of the handle is not restricted at the time of the second squeezing operation in which the binding is completed, when the handle is gripped until the closed state, the bonding or cutting of the tape is executed.

According to the above (2), the movement restricting unit is provided movably by acting on the tape gripping device, and is capable of switching whether or not to restrict the rotation of the clincher arm, by the movement. According to this configuration, the position of the movement restricting unit is directly changed according to the state (standby state or gripping state) of the tape gripping device. Thus, since the presence or absence of restriction is switched, it is possible to control the amount of squeezing by directly determining from the state of the tape gripping device whether the first squeezing operation or the second squeezing operation is performed. Accordingly, it is possible to simply and reliably control the amount of squeezing.

According to the above (3), the tape guide functions as the movement restricting unit. According to this configuration, the movement restricting unit can be realized without using an additional member. In addition, since the tape can be cut after being sufficiently pulled out by the movement of the tape guide, it is possible to cut the tape at a position where a sufficient gripping margin is ensured. When the sufficient gripping margin is ensured, the tape gripping device can reliably grip the tape in the next gripping operation.

DETAILED DESCRIPTION

An embodiment of the invention will be described with reference to the drawings. In the following description, the front means a direction (a right direction in FIG. 2) in which a binding machine for gardening 10 faces an object S to be bound at the time of use, and the rear means a direction (a left direction in FIG. 2) opposite to the front.

Figure 1:
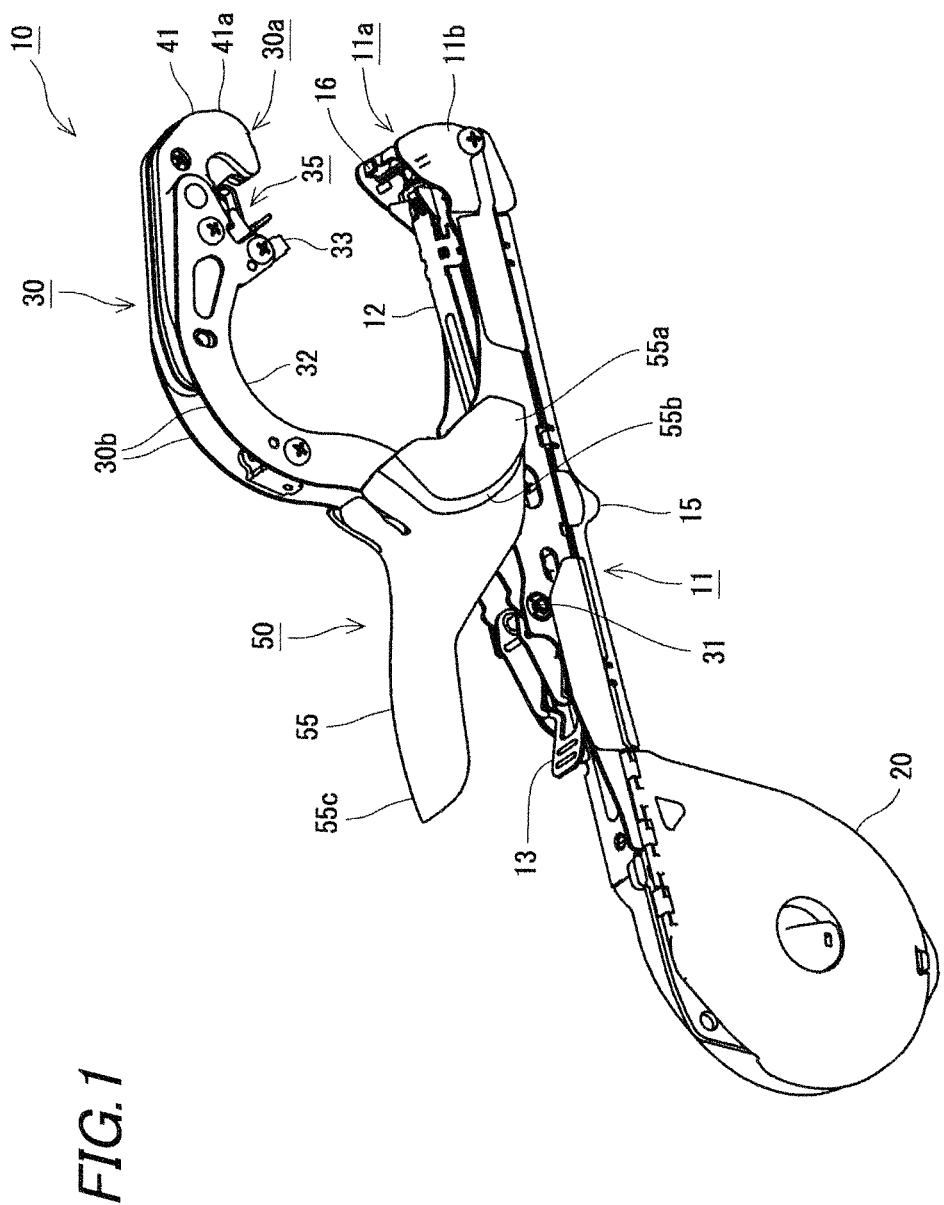
FIG. 1 is an external perspective view of a binding machine for gardening.
Figure 2:
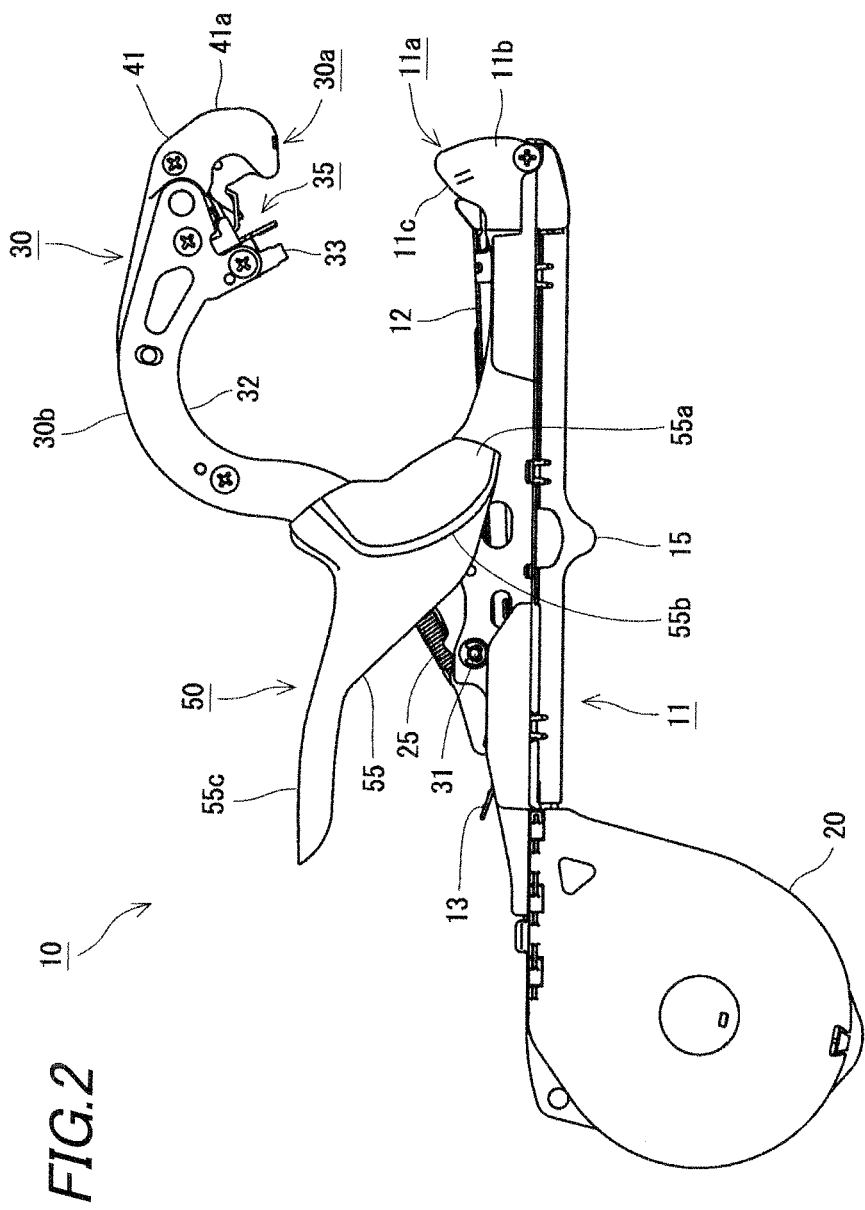
FIG. 2 is a side view of the binding machine for gardening and illustrates a state in which a clincher arm is opened with respect to a main handle.
Figure 3:
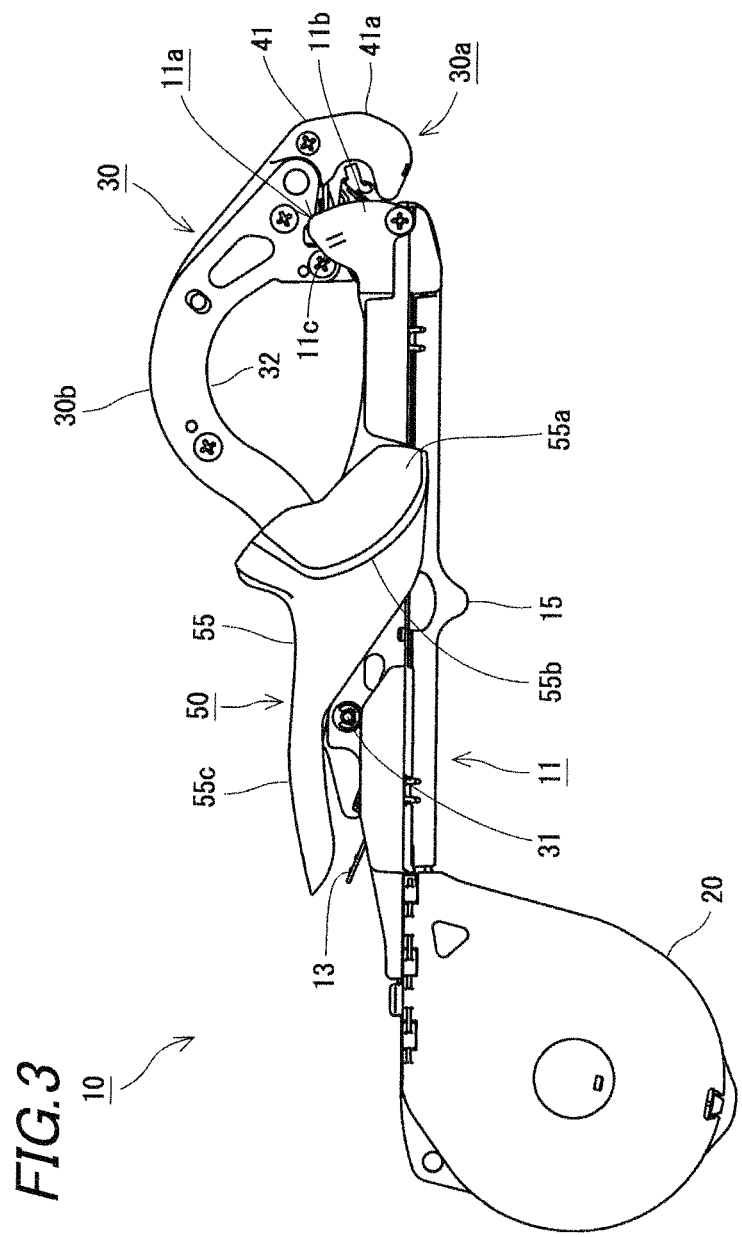
FIG. 3 is a side view of the binding machine for gardening and illustrates a state in which the clincher arm is completely closed with respect to the main handle.
Figure 4:
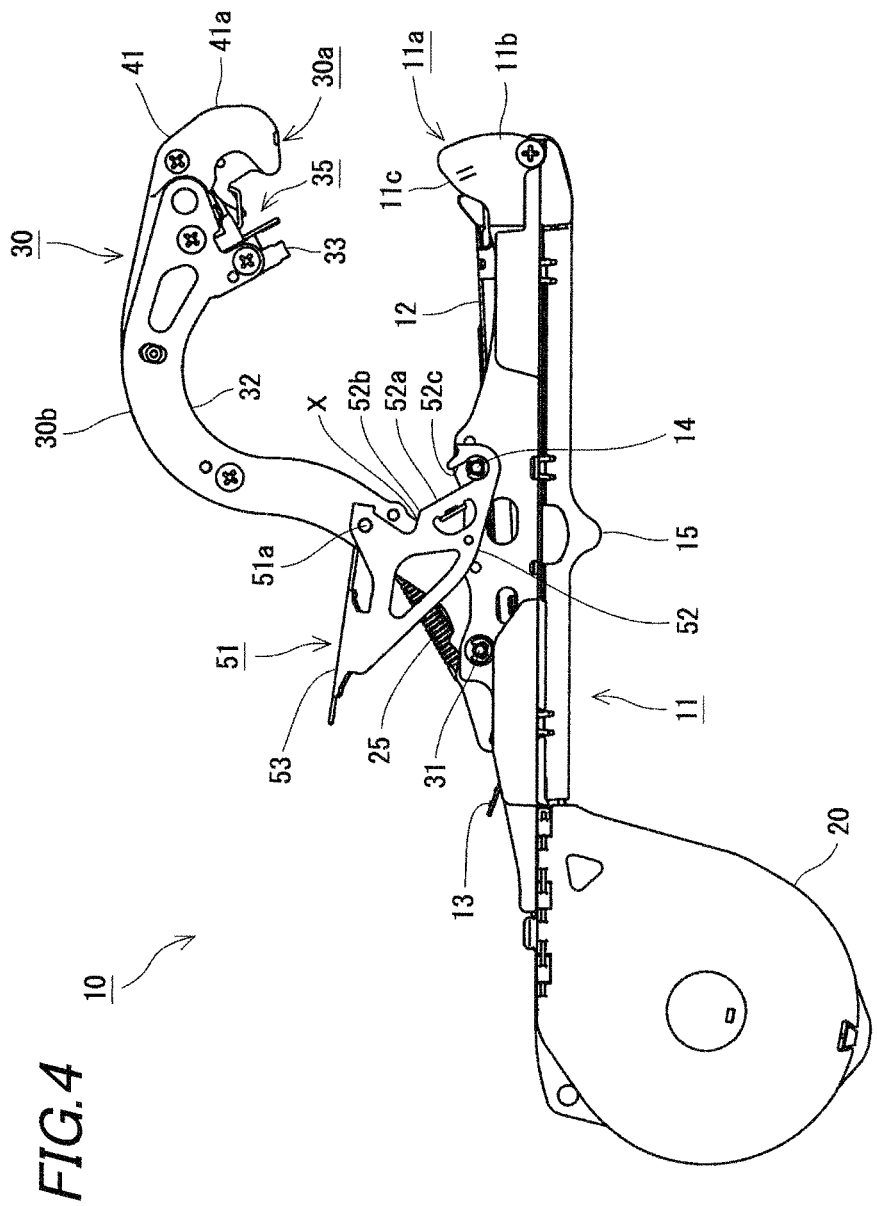
FIG. 4 is a side view of the binding machine for gardening from which a cover member of an operation handle is removed and illustrates a state in which the clincher arm is opened with respect to the main handle.

As illustrated in FIGS. 1 to 3, the binding machine for gardening 10 according to the embodiment is used for guiding/binding work in agricultural crop cultivation includes an elongated main handle 11 that is linearly formed, a clincher arm 30 that is rotatably attached to the main handle 11, and an operation handle 50 that is rotatably attached to the clincher arm 30. As illustrated in FIG. 4, the clincher arm 30 is constantly urged by a tension spring 25, and is in an open state with respect to the main handle 11 in normal times. When the operation handle 50 and the main handle 11 are gripped from this state, as illustrated in FIG. 3, the clincher arm 30 is configured to rotate in a closing direction with respect to the main handle 11. Then, when the clincher arm 30 rotates in the closing direction up to a predetermined position with respect to the main handle 11, in order to draw out a tape 60 from a front end portion 11a of the main handle 11, a gripping operation is executed to grip the tape 60 at a front end portion 30a of the clincher arm 30 and a binding operation is executed to bundle the object S to be bound with the tape 60 and to cut the tape 60 when the clincher arm 30 further rotates in the closing direction from the predetermined position with respect to the main handle 11 and is thus completely closed (closed state). In the gripping operation, that is, the clincher arm 30 rotates with respect to the main handle 11 up to a predetermined position without squeezing the handle up to a completely closed position. Meanwhile, in the binding operation, the clincher arm 30 further rotates in the closing direction from the predetermined position with respect to the main handle 11 by performing a squeezing operation of the handle up to the completely closed position. In this way, the gripping operation and the binding operation can be switched by the end point position of the squeezing operation. As will be described in detail below, in the embodiment, movement of the clincher arm 30 is restricted so as not to further rotate in the closing direction from the predetermined position when the gripping operation is performed, whereas the restriction is canceled when the binding operation is performed. For this reason, even if a worker does not recognize the end point position of the squeezing operation, when the operation of squeezing the depth side is performed, the gripping operation and the binding operation are automatically performed in turns.

Figure 19:
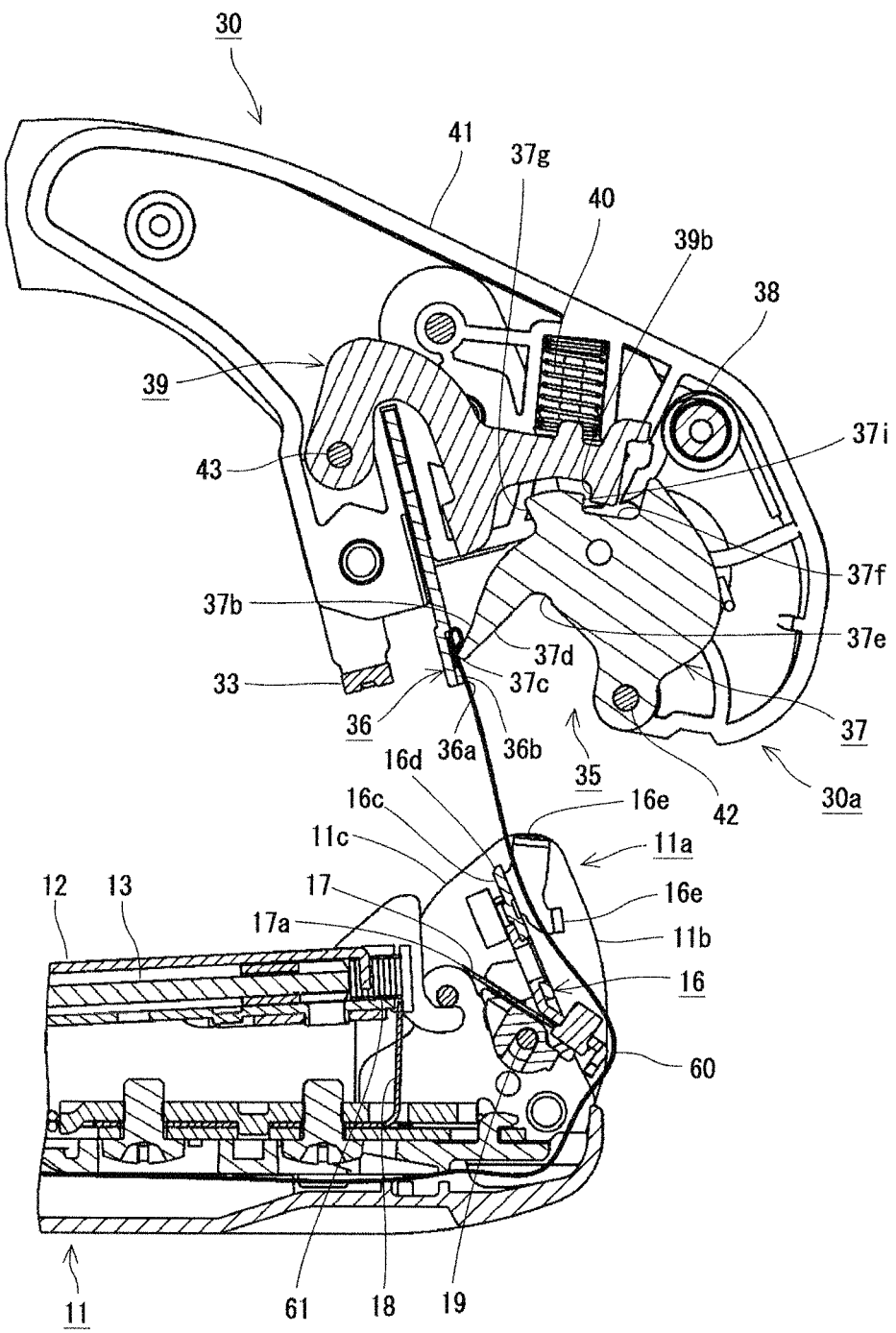
FIG. 19 is a partially enlarged sectional view of the binding machine for gardening and illustrates a state in which a tape is gripped and drawn out by a tape gripping device.
Figure 22:
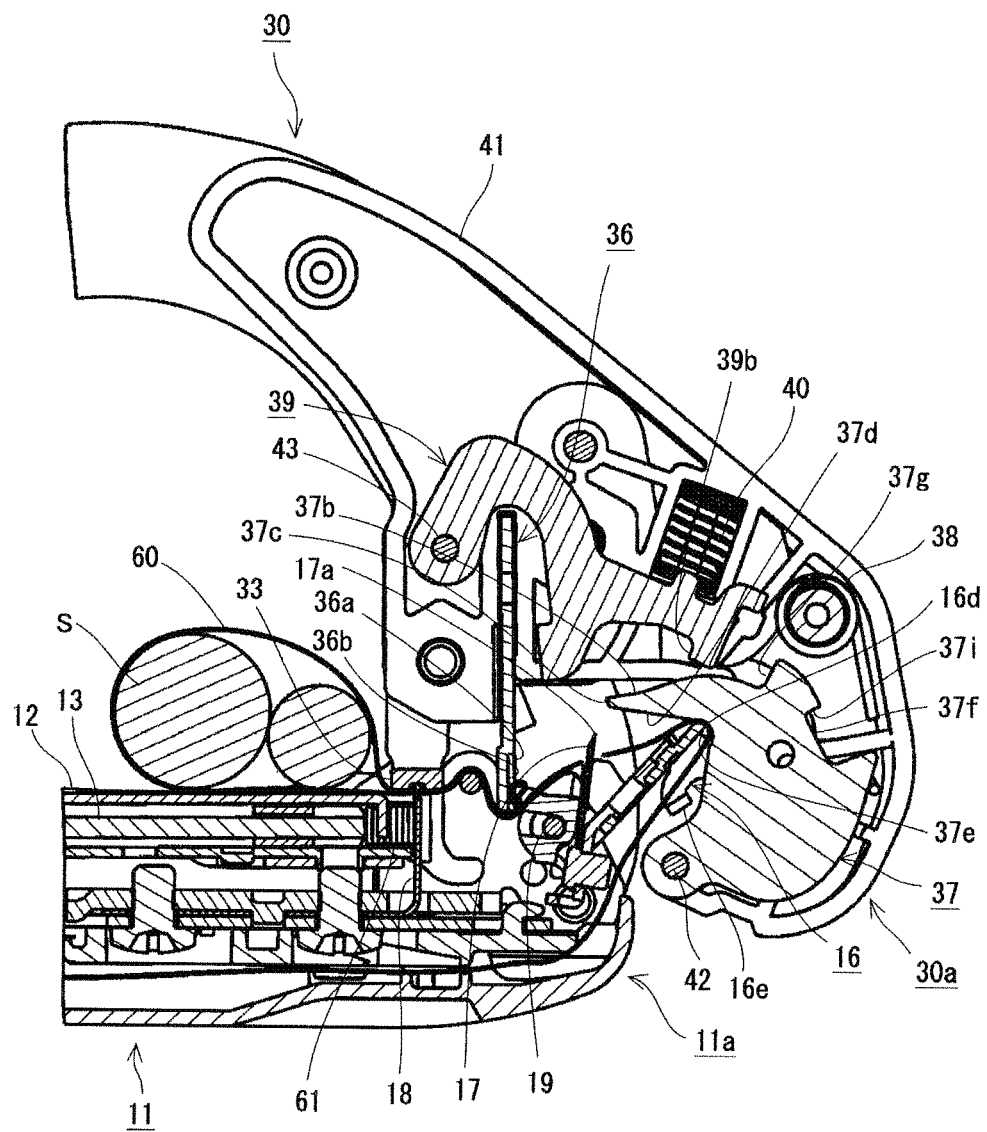
FIG. 22 is a partially enlarged sectional view of the binding machine for gardening and illustrates a state in which a tape is cut.

First, the handle is gripped, and the clincher arm 30 rotates in the closing direction with respect to the main handle 11, thereby binding the object S to be bound. Thus, the gripping operation is executed to grip the tape 60 at the front end portion 30a of the clincher arm 30. Thereafter, when the squeezing of the handle is released and thus the clincher arm 30 rotates in the opening direction with respect to the main handle 11, as illustrated in FIG. 19, the front end portion 30a of the clincher arm 30 and the front end portion 11a of the main handle 11 are separated from each other in a state where the tape 60 is gripped, and the tape 60 is in a state of being stretched between the clincher arm 30 and the main handle 11. The objects S to be bound such as seedlings or branches are introduced from the outside of the tape 60 stretched in this state, the handle is gripped again, and thus the clincher arm 30 rotates in the closing direction with respect to the main handle 11. Thus, as illustrated in FIG. 22, both ends of a tape loop for binding the objects S to be bound are bonded by a staple 61, and the tape 60 is cut (the binding operation is executed). In this manner, the gripping operation is executed in the first squeezing operation, and the binding operation is executed in the second squeezing operation. When the gripping operation and the binding operation are executed in turns, the objects S to be bound can be bound. In the embodiment, the staple 61 is used as a bonding unit for bonding the both ends of the tape loop, but the both ends of the tape loop may be bonded by adhesion or welding without being limited thereto.

As illustrated in FIG. 1 and the like, the main handle 11 is a bar-like member which is linearly formed, and is formed such that the tape 60 and the staple 61 can be formed along a longitudinal direction. A staple magazine 12, a pusher unit 13, a tape guide 16, a staple driver 18, and a tape magazine 20 are attached to the main handle 11.

The staple magazine 12 is a long member for accommodating the staple 61. As illustrated in FIG. 1 and the like, the staple magazine 12 is disposed along the longitudinal direction of the main handle 11, and can accommodate the staple 61 therein. As the staple 61 accommodated in the staple magazine 12, a plurality of U-shaped staples 61 bonded with an adhesive are used. The staple 61 accommodated in the staple magazine 12 is pushed toward the front end portion by the pusher unit 13 which will be described below. At the front end portion of the staple magazine 12, a long hole is provided to introduce the staple driver 18 which will be described below. In addition, the staple magazine 12 is attached to the main handle 11 so as to be rockable around a shaft provided at a rear end side.

Figure 6:
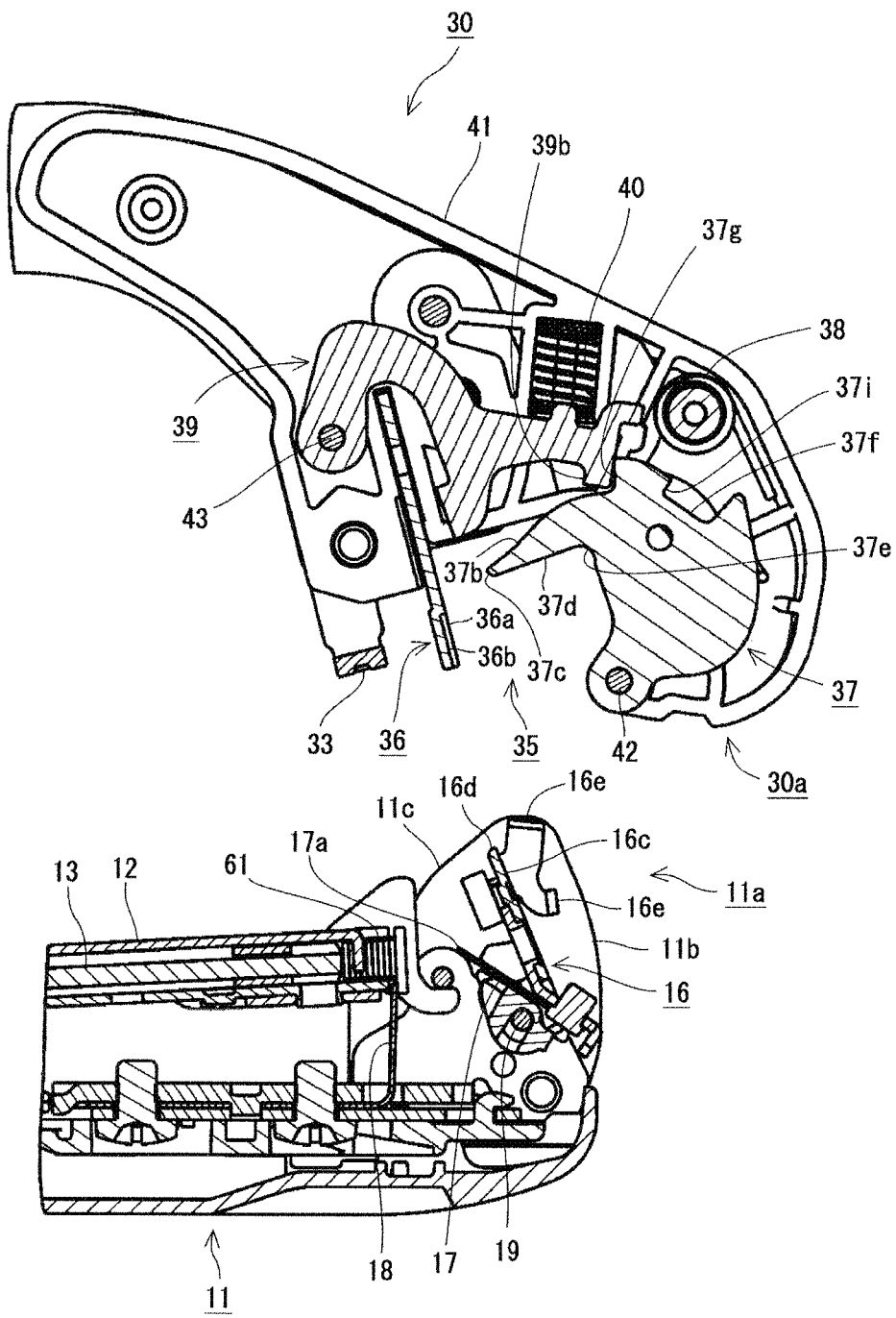
FIG. 6 is an enlarged sectional view of the vicinity of a front end portion of the binding machine for gardening.

As illustrated in FIG. 1 and the like, the pusher unit 13 is a member that can be inserted and attached to the staple magazine 12. As illustrated in FIG. 6 and the like, the pusher unit 13 urges the staple 61 accommodated in the staple magazine 12 toward the front. When the staple 61 is set in the staple magazine 12, the pusher unit 13 is drawn down to insert the staple 61 from the top of the staple magazine 12.

As illustrated in FIG. 6 and the like, the staple driver 18 is a plate fixed to the front end portion 11a of the main handle 11 so as to face the vicinity of the front end portion of the staple magazine 12. The staple driver 18 is forming to have substantially the same width as the staple 61 so that only one staple 61 can be ejected. When the clincher arm 30 rotates to the state of being completely closed with respect to the main handle 11, as illustrated in FIG. 22, the staple driver 18 enters into the staple magazine 12, thereby ejecting the leading staple 61 accommodated in the staple magazine 12. Specifically, when the clincher arm 30 moves in the closing direction, the clincher arm 30 pushes the staple magazine 12 to rock it toward the staple driver 18. As the staple magazine 12 rocks, the staple driver 18 enters into the staple magazine 12, thereby ejecting the staple 61. After penetrating through the tape 60, the ejected staple 61 is clinched by the clincher 33 to be described below, so that two legs thereof are refracted to embrace the tape 60 and thus bonded to an end 60a of the overlapped tape 60.

Figure 12:
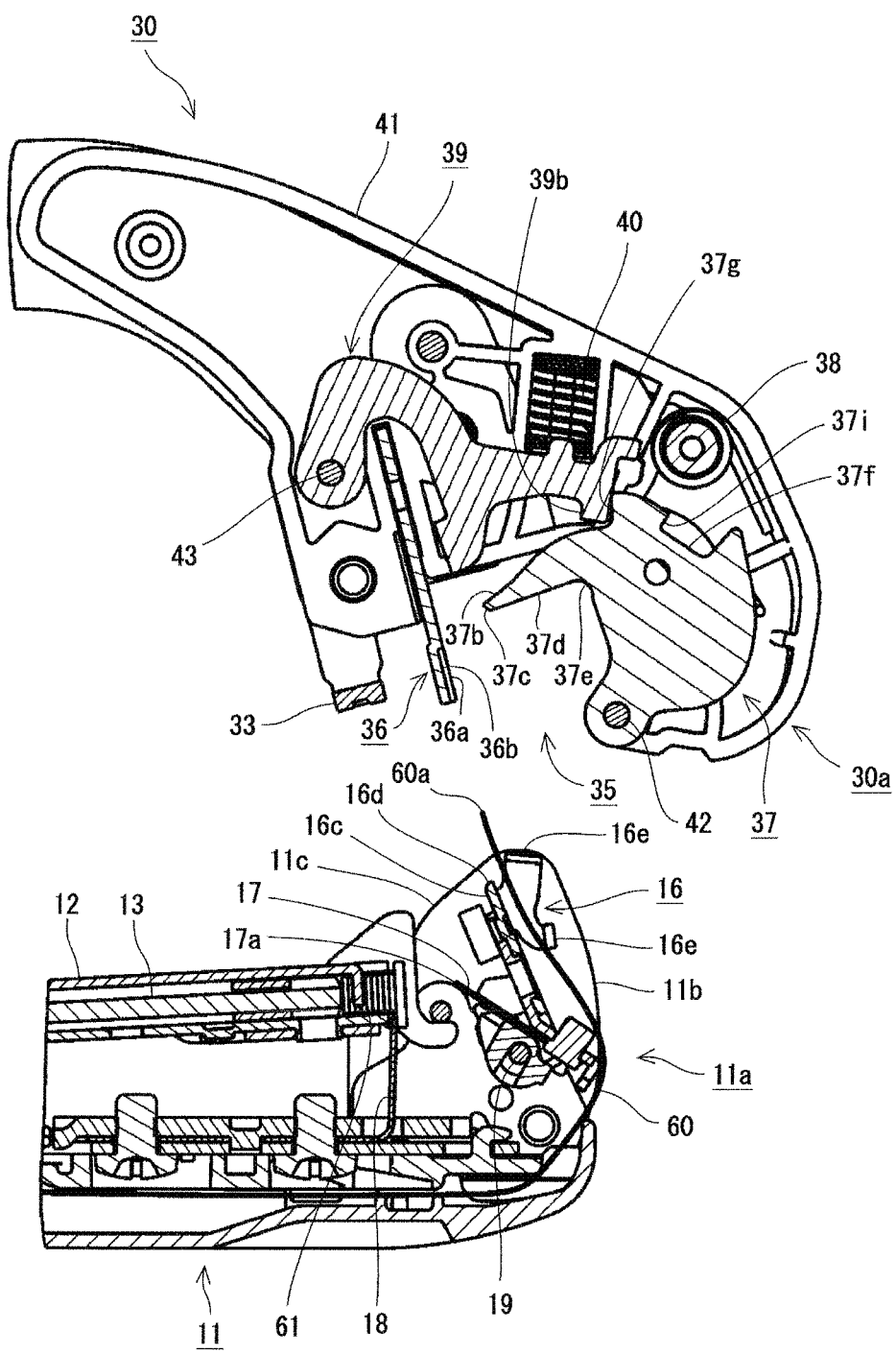
FIG. 12 is a partially enlarged sectional view of the binding machine for gardening and illustrates a state before a gripping operation is executed.
Figure 13:
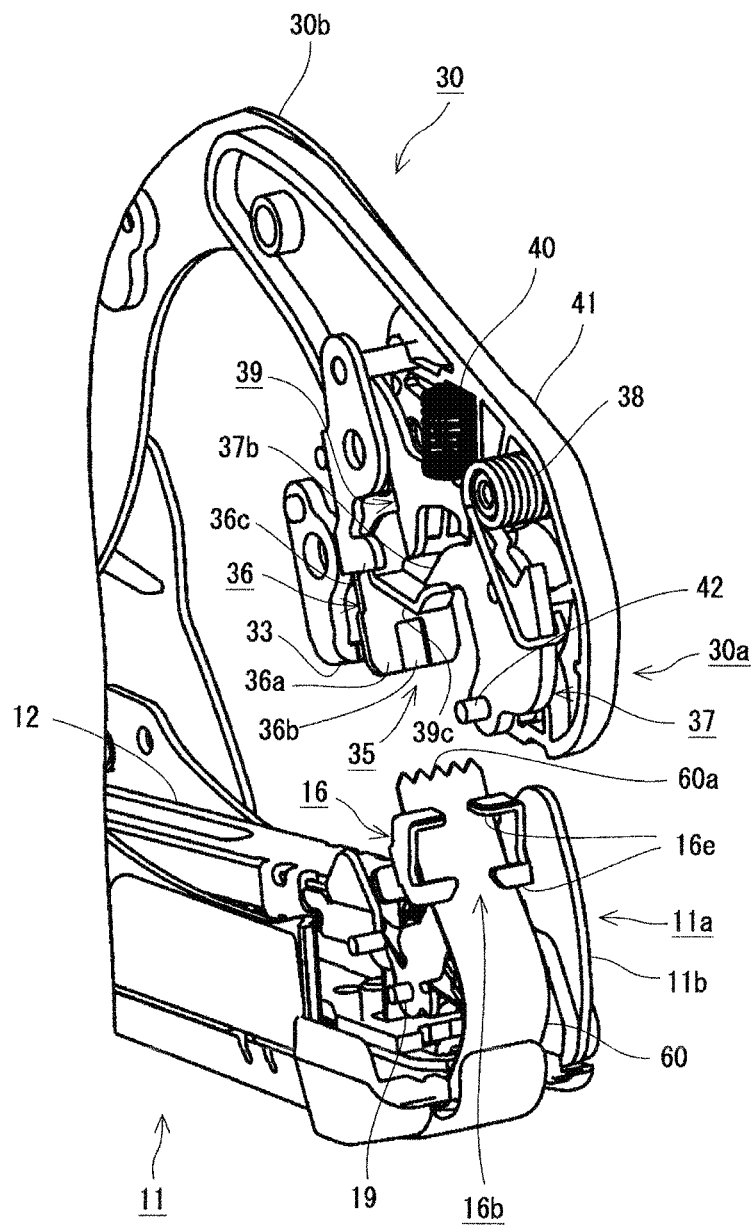
FIG. 13 is a partially enlarged perspective view of the binding machine for gardening and illustrates a state before the gripping operation is executed.

As illustrated in FIG. 1 and the like, the tape magazine 20 is provided continuously with a rear end of the main handle 11 to accommodate the tape 60. The tape magazine 20 is capable of accommodating the tape 60 wound in a reel shape, and has a lid which can be openable to take in and out the tape 60. The tape 60 accommodated in the tape magazine 20 is drawn out to the front end portion 11a of the main handle 11 along the main handle 11. In the tape 60 drawn out to the front end portion 11a of the main handle 11, as illustrated in FIGS. 12 and 13, the end 60a thereof is held by the tape guide 16 which will be described below.

Figure 7:
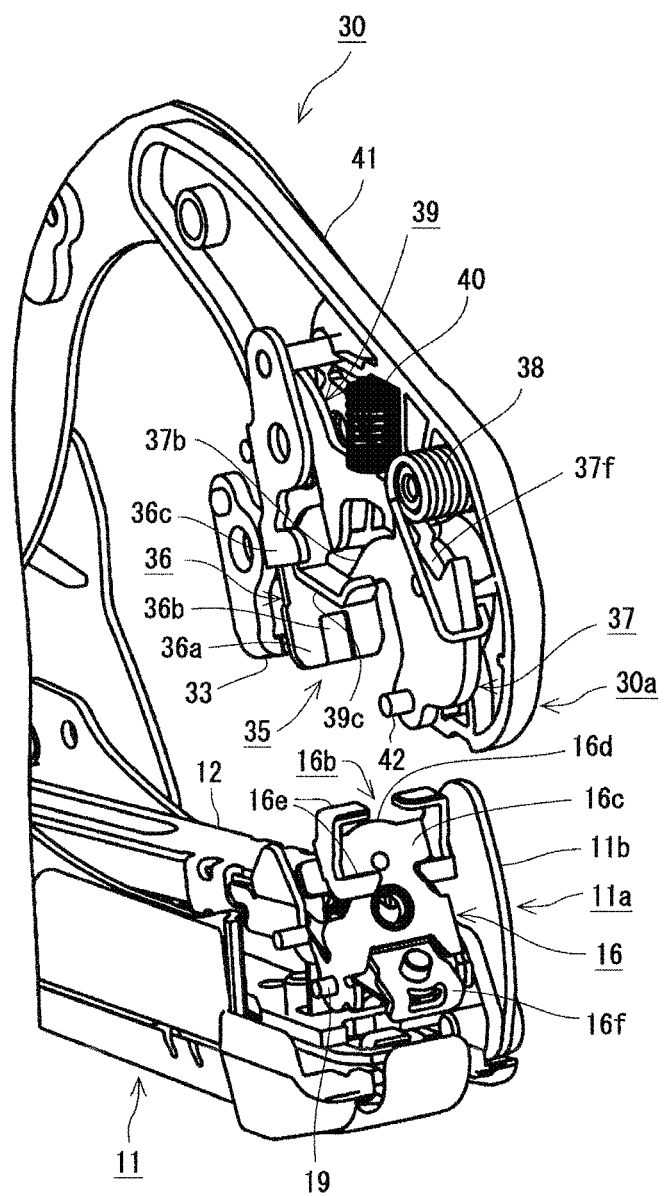
FIG. 7 is a perspective view illustrating an internal structure in the vicinity of the front end portion of the binding machine for gardening.

As illustrated in FIGS. 6 and 7, the tape guide 16 is disposed at the front end portion 11a of the main handle 11, and is attached so as to be rockable around a tape guide rocking shaft 19 provided in the main handle 11. The tape guide 16 has a guide path at a center thereof as illustrated in FIG. 13, the tape 60 being guided so as to be drawable through the guide path. The guide path of the tape guide 16 has such a shape as to cover four sides such as both sides, a front side, and a rear side of the tape 60, so that the inserted tape 60 is not detached. The tape 60 inserted through the guide path is drawn out from the front end portion and faces the clincher arm 30. The end 60a of the tape 60 is gripped by a tape gripping device 35, which will be described below, of the clincher arm 30, and is drawn out by a required amount.

Figure 8A:
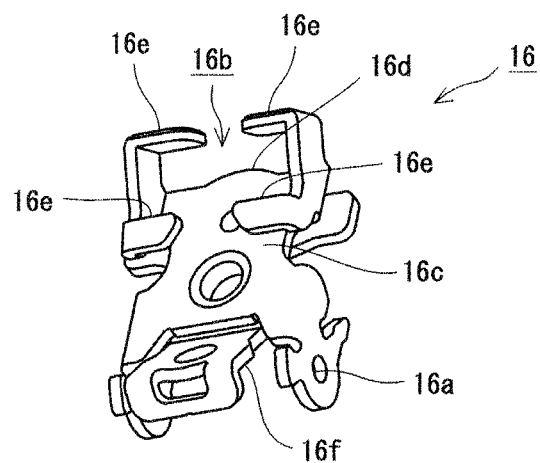
FIG. 8A is a perspective view of a tape guide as viewed from the front.
Figure 8B:
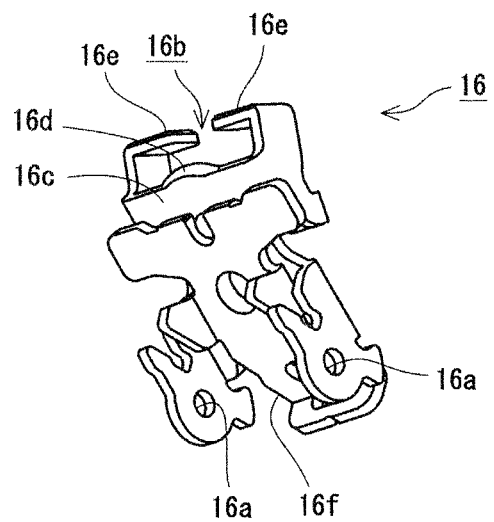
FIG. 8B is a perspective view of the tape guide as viewed from the rear.

As illustrated in FIGS. 8A and 8B, the tape guide 16 includes a rocking shaft hole 16a, a slit 16b, a back surface portion 16c, an abutment portion 16d, a tape holding portion 16e, and a cutting blade fitting portion 16f.

The rocking shaft hole 16a is a round hole through which the tape guide rocking shaft 19 penetrates. The rocking shaft hole 16a is provided at a lower part of the tape guide 16 (a side far from the clincher arm 30). The rocking shaft hole 16a is pivotally supported by the tape guide rocking shaft 19, and thus an end portion of the tape guide 16 facing the clincher arm 30 is rockable forward. Although not specifically illustrated, the tape guide 16 is constantly urged rearward by an urging member.

The back surface portion 16c is a plate-shaped portion that supports the tape 60 from the rear side. The tape holding portions 16e protrude forward from both sides of the back surface portion 16c. The tape holding portions 16e are configured to hold the tape 60 in accordance with the back surface portion 16c. In the embodiment, a pair of tape holding portions 16e are provided at each of two upper and lower parts, and four tape holding portions 16e are provided. Each of the tape holding portions 16e is formed in a substantially L shape, and the pair of upper and lower tape holding portions 16e are disposed such that the front end portions thereof are opposed to each other. Thus, the slit 16b is formed between the opposing front end portions of the tape holding portions 16e. The slit 16b allows a gripping member 37, which will be described below, to enter into the guide path.

As illustrated in FIGS. 8A and 8B, the abutment portion 16d is formed at an upper end edge of the back surface portion 16c, contacts with an inclined surface 37d of the gripping member 37 which will be described below, and slides along the inclined surface 37d. The abutment portion 16d protrudes toward the front end portion in an R shape, and thus is formed so as not to contact with both side edges of the inclined surface 37d of the gripping member 37. The contact with the edges of the inclined surface 37d is prevented, and thus when the tape 60 is sandwiched and pulled by the abutment portion 16d and the gripping member 37 as will be described below, it is prevented that a hole is generated in the tape 60 or the tape 60 is torn.

The cutting blade fitting portion 16f is configured to fix the cutting blade 17 for cutting the tape 60 after the binding of the objects S to be bound. As illustrated in FIG. 6 and the like, the cutting blade 17 is attached to the cutting blade fitting portion 16f so as to form an angle with respect to the guide path of the tape 60 behind the guide path of the tape 60. When the cutting blade 17 is fixed to the tape guide 16 in this way and thus the tape guide 16 rocks, the cutting blade 17 rocks in conjunction with the tape guide 16.

That is, as illustrated in FIG. 12, the cutting blade 17 is disposed such that a cutting edge 17a is directed backward in normal times, but the cutting edge 17a moves to be directed upward as illustrated in FIG. 22 when cutting the tape 60. As described above, the cutting blade 17 according to the embodiment is exposed so that the cutting edge 17a faces the tape 60 when cutting the tape 60. In the embodiment, the tape 60 rocks in conjunction with the tape guide 16. However, for example, the tape guide 16 is formed to move in a straight direction, and the cutting blade 17 may move in the straight direction in conjunction with the tape guide 16. Further, a member in the vicinity of the cutting blade 17 such as the tape guide 16 or the staple magazine 12 may move instead of the movement of the cutting blade 17, and the cutting edge 17a of the cutting blade 17 may be exposed so as to face the tape 60.

As illustrated in FIG. 1, both sides of the tape guide 16 and the cutting blade 17 are covered with a sidewall 11b which is a part of the main handle 11, and as illustrated in FIGS. 2 and 6, the tape guide 16 and the cutting blade 17 are not exposed in a side view. In other words, the main handle 11 is provided with the sidewall 11b which is disposed so as to overlap with the cutting edge 17a of the cutting blade 17 in a side view. The sidewall 11b is disposed so as to constantly overlap with the cutting edge 17a of the cutting blade 17 in a side view regardless of the state of the cutting blade 17 (either before or after the cutting blade 17 has moved). Therefore, even when foreign materials are caught by the front end portion 11a of the main handle 11, the cutting blade 17 is not stuck by the foreign materials. A rear side of the sidewall 11b is an inclined portion 11c, so that even when the object S to be bound is sandwiched by the front end portion 11a of the main handle 11, the object S to be bound can be guided toward the rear side (the main handle 11 and an inner side of the clincher arm 30).

Figure 5:
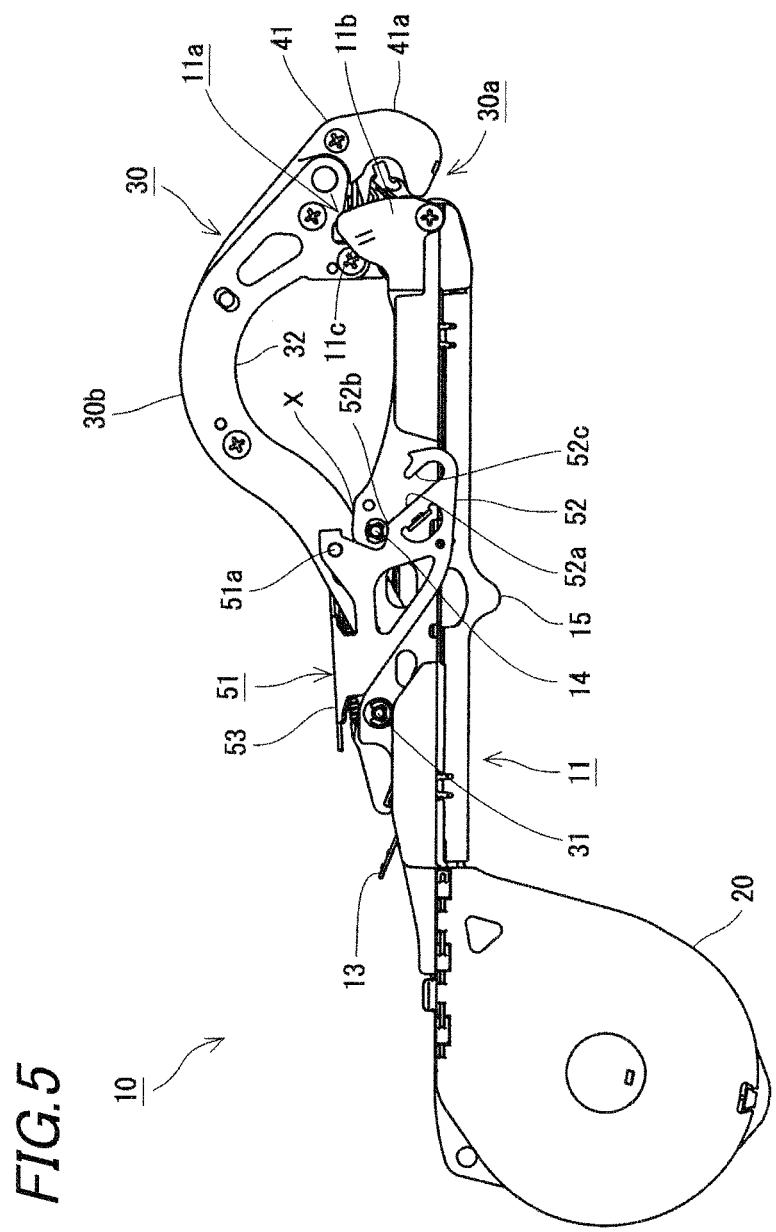
FIG. 5 is a side view of the binding machine for gardening from which the cover member of the operation handle is removed and illustrates a state in which the clincher arm is completely closed with respect to the main handle.

As illustrated in FIGS. 4 and 5, a roller-like engaging portion 14 is protrudingly formed on both sides of the main handle 11, and a finger hooking portion 15 is protrudingly formed on a lower surface of the main handle 11. The roller-like engaging portion 14 is a projection for slidably guiding a link portion 52 of the operation handle 50 which will be described below. The finger hooking portion 15 is a projection for hooking a finger squeezing the handle when the main handle 11 and the operation handle 50 are gripped.

As illustrated in FIG. 1 and the like, the clincher arm 30 is constituted by a pair of sheet metal members 30b connected to each other in parallel. The clincher arm 30 includes an arm portion 32 that extends curvedly toward the front end portion 30a so that a C-shaped opening can be formed between the clincher arm 30 and the main handle 11. The clincher arm 30 is rotatably attached to the main handle 11 by a rotating shaft 31 provided in the vicinity of the rear end.

The clincher 33, the tape gripping device 35, and a gripping device cover 41 are attached to the clincher arm 30.

The clincher 33 is fixed to the front end portion 30a of the clincher arm 30 so as to face the front end portion of the staple driver 18 described above. Thus, as illustrated in FIG. 22, when the staple 61 is ejected by the staple driver 18, the two legs of the ejected staple 61 are clinched by the clincher 33 and bent inward. When the clincher 33 bends the two legs of the staple 61 inward, so that the two legs bind the tape 60 and are thus bonded thereto.

The tape gripping device 35 is attached to the front end portion 30a of the clincher arm 30 and is capable of gripping the end 60a of the tape 60 drawn out from the front end portion 11a of the main handle 11. The tape gripping device 35 includes a support portion 36, a gripping member 37, a gripping member urging unit 38, a lock member 39, and a lock member urging unit 40.

Figure 9:
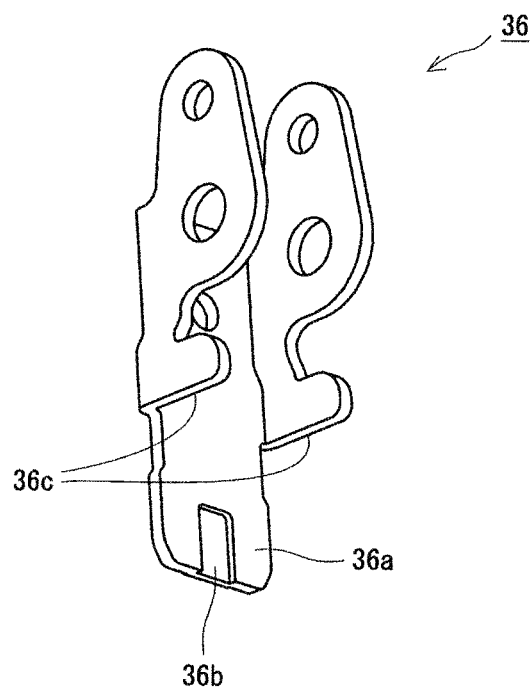
FIG. 9 is a perspective view of a support portion.

As illustrated in FIG. 6 and the like, the support portion 36 is fixed to the clincher arm 30 along the drawing direction of the tape 60, and includes a plate-like receiving portion 36a capable of supporting the rear surface of the tape 60. As illustrated in FIG. 9, a recessed portion 36b is formed in the receiving portion 36a. The recessed portion 36b is a portion to be engaged with a contact portion 37c of the gripping member 37 which will be described below, and has a groove narrower than the tape 60 and wider than the contact portion 37c. In addition, movement restricting portions 36c are protrudingly formed on both sides of the receiving portion 36a. The movement restricting portion 36c is provided to restrict the rotation of the clincher arm 30 by being brought into contact with tape guide 16.

Figure 10:
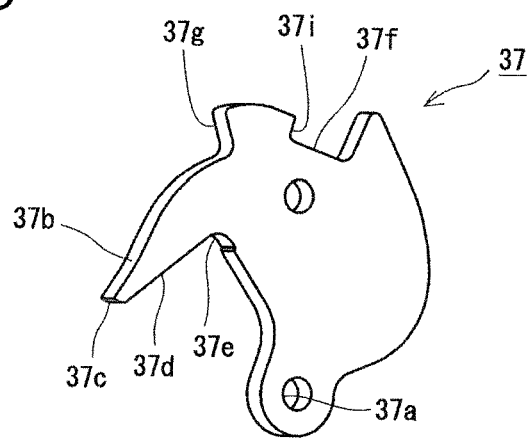
FIG. 10 is a perspective view of a gripping member.

The gripping member 37 is provided so as to face the support portion 36, and is provided movably toward the support portion 36 so as to grasp the tape 60. As illustrated in FIG. 10, the gripping member 37 includes a rotating shaft hole 37a, a claw portion 37b, a contact portion 37c, an inclined surface 37d, a V-shaped portion 37e, a peripheral surface 37f, a locked portion 37g, and a rotation blocking portion 37i.

The rotating shaft hole 37a is a hole through which a gripping member rotating shaft 42 penetrates. When the gripping member rotating shaft 42 penetrates through the rotating shaft hole 37a, the gripping member 37 is pivotally supported to be rotatable with respect to the clincher arm 30.

The claw portion 37b is a protruding portion for grasping the tape 60 in accordance with the receiving portion 36a of the support portion 36. The contact portion 37c capable of entering into the above-described recessed portion 36b is formed at a front end portion of the claw portion 37b. Thus, when the gripping member 37 is operated, the tape 60 can be firmly gripped by the concave-convex members (recessed portion 36b and contact portion 37c) through which the support portion 36 and the gripping member 37 are engaged with each other. That is, when the tape 60 is gripped with the concave-convex members, an intermediate part of the tape 60 is in a state of being pushed into the groove of the recessed portion 36b. In this state, a restoring force of the bent tape 60 is applied on the edge of the recessed portion 36b, so that a frictional force becomes larger and thus the tape 60 is difficult to come off.

The surface of the claw portion 37b on the main handle 11 side forms the inclined surface 37d. The inclined surface 37d is disposed to face the abutment portion 16d of the tape guide 16, and is provided to guide the abutment portion 16d of the tape guide 16 in contact therewith. Further, the V-shaped portion 37e is provided on the side opposite to the front end portion of the inclined surface 37d. The V-shaped portion 37e is configured such that the tape guide 16 sliding along the inclined surface 37d cannot further slide, and is formed to have an angle with respect to the inclined surface 37d.

In addition, the locked portion 37g and the rotation blocking portion 37i are provided on the peripheral surface 37f of the gripping member 37 on the opposite side of the main handle 11. The locked portion 37g and the rotation blocking portion 37i are formed using projections protrudingly formed on the peripheral surface 37f of the gripping member 37, and are configured to be engaged with the lock member 39 to be described below. The lock member 39 moves along the peripheral surface 37f of the gripping member 37, and can be engaged with the locked portion 37g or the rotation blocking portion 37i depending on circumstances.

The gripping member urging unit 38 is configured to urge the gripping member 37 toward the support portion 36. The gripping member urging unit 38 according to the embodiment is a torsion coil spring as illustrated in FIG. 7 and the like. When the gripping member urging unit 38 urges the gripping member 37 and thus the lock operation of the lock member 39 to be described below is released, the gripping member 37 operates, and the tape 60 can be gripped between the support portion 36 and the gripping member 37 from both sides thereof.

Figure 11A:
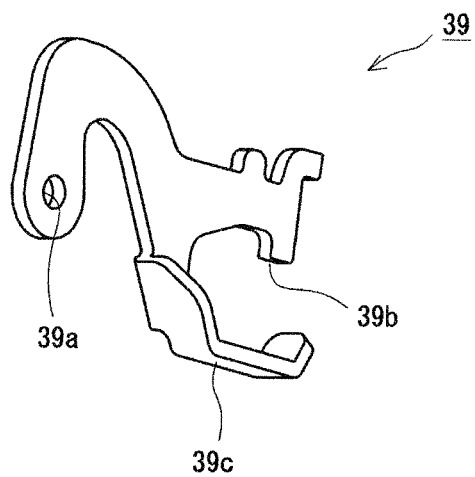
FIGS. 11A and 11B are a perspective view and a side view of a lock member, respectively.
Figure 11B:
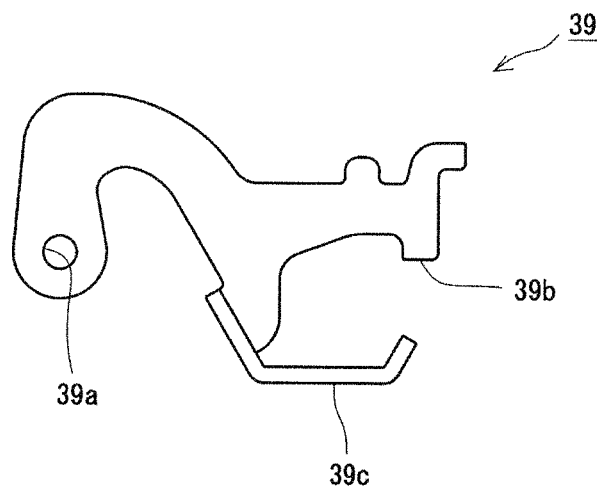

The lock member 39 is configured to hold the gripping member 37 at a standby position against an urging force of the gripping member urging unit 38 by being engaged with the gripping member 37. The lock member 39 includes a rotating shaft hole 39a, a locking portion 39b, and a pressed portion 39c as illustrated in FIGS. 11A and 11B.

The rotating shaft hole 39a is a hole through which the lock member rotating shaft 43 penetrates. The lock member rotating shaft 43 penetrates through the rotating shaft hole 39a, so that the lock member 39 is pivotally supported to be rotatable with respect to the clincher arm 30.

Figure 18:
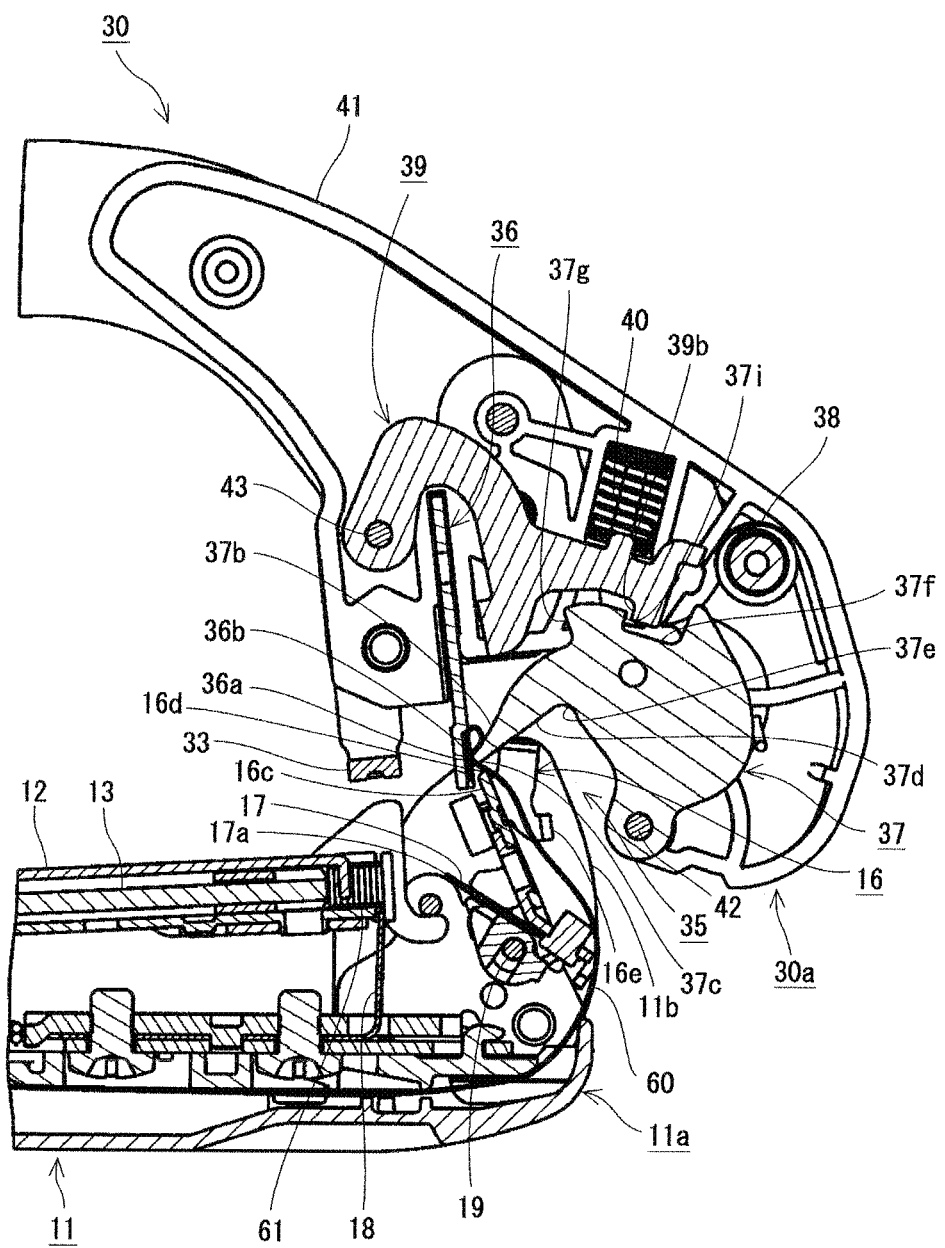
FIG. 18 is a partially enlarged sectional view of the binding machine for gardening and illustrates a state in which the gripping member grips a tape in accordance with the support portion.

The locking portion 39b is a portion for restricting movement of the gripping member 37, and is protrudingly formed to be engageable with the gripping member 37. As illustrated in FIG. 6 and the like, the locking portion 39b is disposed to face the peripheral surface 37f of the gripping member 37, and is engageable with the locked portion 37g and the rotation blocking portion 37i formed on the peripheral surface 37f. Specifically, the locking portion 39b is engaged with the locked portion 37g, so that the tape gripping device 35 can take a standby state of being opened without gripping the tape 60 as illustrated in FIG. 12. Then, when the lock member 39 rotates and thus the locking portion 39b is disengaged from the locked portion 37g, as illustrated in FIG. 18, the tape gripping device 35 can take a gripping state of being closed with the gripping of the tape 60. In the gripping state, the locking portion 39b faces the rotation blocking portion 37i so as to be engageable therewith, and thus the movement of the gripping member 37 is blocked. The rotation blocking portion 37i faces the locking portion 39b, so that the tape gripping device 35 maintains the gripping state until the lock member 39 rotates again.

The pressed portion 39c is a portion that is pushed up when the lock member 39 rocks, and is arranged so as to face the front end portion of the tape guide 16 as illustrated in FIG. 7 and the like. With this arrangement, the tape guide 16 pushes the lock member 39 against the urging force of the lock member urging unit 40 to be described below when the clincher arm 30 rotates in the closing direction with respect to the main handle 11.

The lock member urging unit 40 is configured to urge the lock member 39 in an engaging direction with the gripping member 37. The lock member urging unit 40 according to the embodiment is a compression spring as illustrated in FIG. 7 and the like. The lock member urging unit 40 urges the lock member 39, so that the locking portion 39b of the lock member 39 is constantly urged in an engaging direction with the locked portion 37g or the rotation blocking portion 37i.

The gripping device cover 41 is a cover that covers the tape gripping device 35 described above, and is fixed between two sheet metal members 30b of the clincher arm 30 as illustrated in FIGS. 12 and 13. The gripping device cover 41 according to the embodiment is constituted by split pieces that can be split in left and right directions, and accommodates the tape gripping device 35 therein. The gripping device cover 41 has an opening at a lower side, and the receiving portion 36a and the claw portion 37b of the tape gripping device 35 are disposed at the back of the opening. As illustrated in FIG. 12, the gripping device cover 41 includes a forward protruding portion 41a that covers the front side of the tape gripping device 35. Since the forward protruding portion 41a protrudes forward from the front end portion of the sheet metal member 30b, when the clincher arm 30 is inserted between crops, only the forward protruding portion 41a formed in a curved shape comes in contact with the crops, but the tape gripping device 35 does not come in contact with the crops.

As illustrated in FIGS. 2 to 5, the operation handle 50 includes a base member 51 fixed to the main body of the binding machine for gardening 10 and a cover member 55 detachable from the base member 51.

The base member 51 is a metal component acting directly on the main handle 11 and the clincher arm 30. The base member 51 is attached to the clincher arm 30 so as to be rotatable about a rotation fulcrum 51a as illustrated in FIGS. 4 and 5. Then, the base member 51 includes the link portion 52 engaged with the main handle 11 at one side thereof as viewed from the rotation fulcrum 51a and a handle support portion 53 at the other side thereof as viewed from the rotation fulcrum 51a. The handle support portion 53 is attached with the cover member 55, thereby functioning as a lever operation portion 55c.

The link portion 52 is engaged with the main handle 11 and serves as a point of application of a lever. A hook 52c is formed at the front end portion of the link portion 52, and the hook 52c is engaged with the roller-like engaging portion 14 of the main handle 11, whereby the clincher arm 30 maintains a state of being opened at a predetermined angle with respect to the main handle 11 as illustrated in FIG. 4.

From this state, when the operation handle 50 and the main handle 11 are gripped, as illustrated in FIG. 5, the hook 52c is disengaged from the roller-like engaging portion 14, and the roller-like engaging portion 14 slides on a sliding surface 52a formed on a front surface of the link portion 52. In this way, as the sliding surface 52a slides along the roller-like engaging portion 14, the clincher arm 30 rotates in the closing direction with respect to the main handle 11. An inclination of the sliding surface 52a used for the engagement of the roller-like engaging portion 14 changes stepwise in order to reduce an operation load when the staple 61 is ejected. That is, the inclination of the sliding surface 52a becomes larger at the time of the binding operation rather than at the time of the gripping operation, so that a larger force can be obtained at the time of the binding operation even with the same operation load. Thus, the binding operation requiring a large force can be also performed with a light operation load. In this way, since the inclination of the sliding surface 52a changes, a projection 52b is formed in a place where the inclination of the sliding surface 52a changes.

As illustrated in FIG. 2 and the like, the cover member 55 covers the base member 51 so as to prevent it from being exposed. All the contact portions or the operation portions with/of the outside of the operation handle 50 are covered with the cover member 55. The cover member 55 includes a hook cover 55a and a lever operation portion 55c.

The hook cover 55a covers the link portion 52 and a crossing portion X (see FIGS. 4 and 5) between the main handle 11 and the clincher arm 30. On the side surface of the hook cover 55a, a curved projection 55b is provided along the finger squeezing the lever operation portion 55c and the main handle 11 as illustrated in FIG. 1 and the like. When the curved projection 55b is provided, the operation handle 50 is easily gripped and can be held with a light grip even when the machine is held upward.

The lever operation portion 55c covers the handle support portion 53, and is gripped by an operator when the operation handle 50 is operated. When the lever operation portion 55c is gripped in a direction approaching the main handle 11, the base member 51 rotates about the rotation fulcrum 51a, and the link portion 52 acts on the main handle 11, whereby the main handle 11 and the clincher arm 30 rotate in the closing direction with respect to each other.

A method of using the binding machine for gardening 10 will be described below.

When the binding work is performed using the binding machine for gardening 10, first, the lock member 39 and the gripping member 37 are engaged with each other as illustrated in FIGS. 12 and 13, thereby setting the gripping member 37 to be in the standby state.

Figure 14:
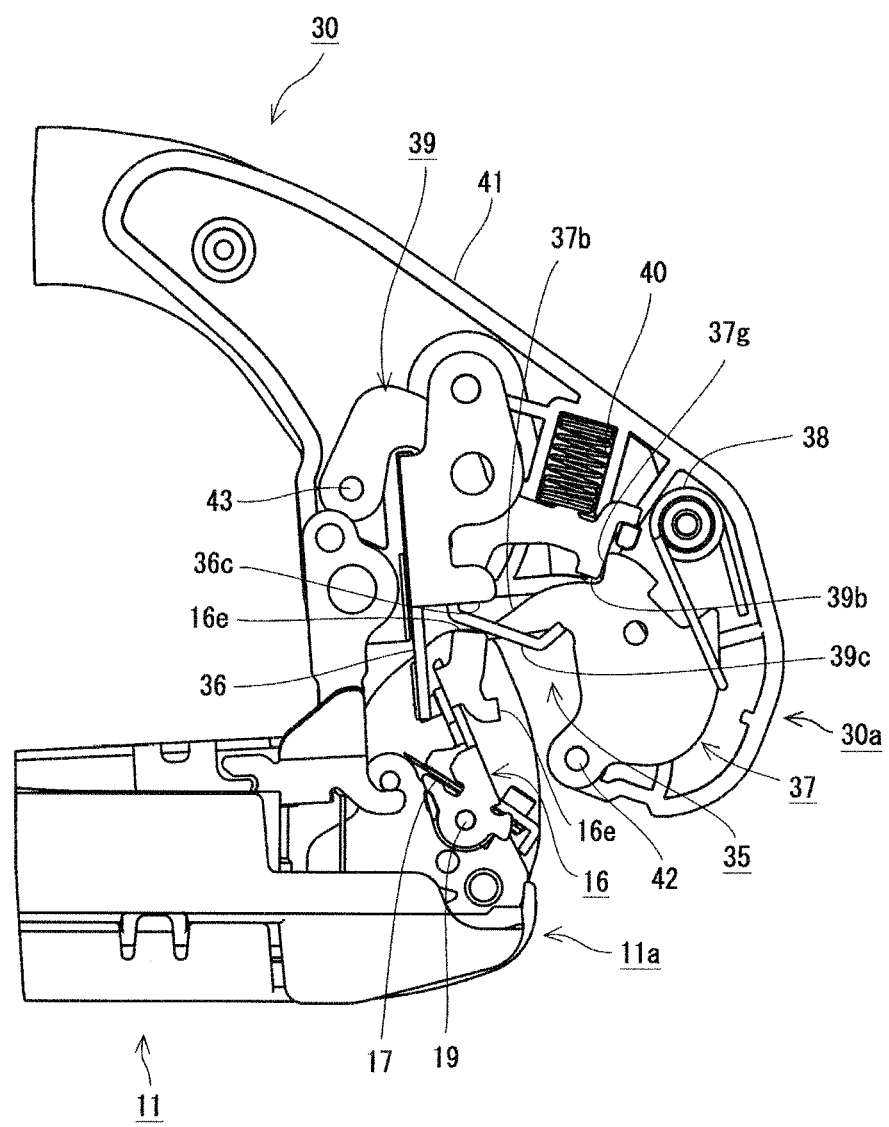
FIG. 14 is a view for explaining a relation between the tape guide and the lock member and the support portion and illustrates a state before the tape guide comes in contact with the lock member and the support portion.

In this state, when the handle is gripped and the clincher arm 30 rotates in the closing direction with respect to the main handle 11, the tape holding portion 16e of the tape guide 16 comes in contact with the pressed portion 39c of the lock member 39 as illustrated in FIG. 14.

Figure 15:
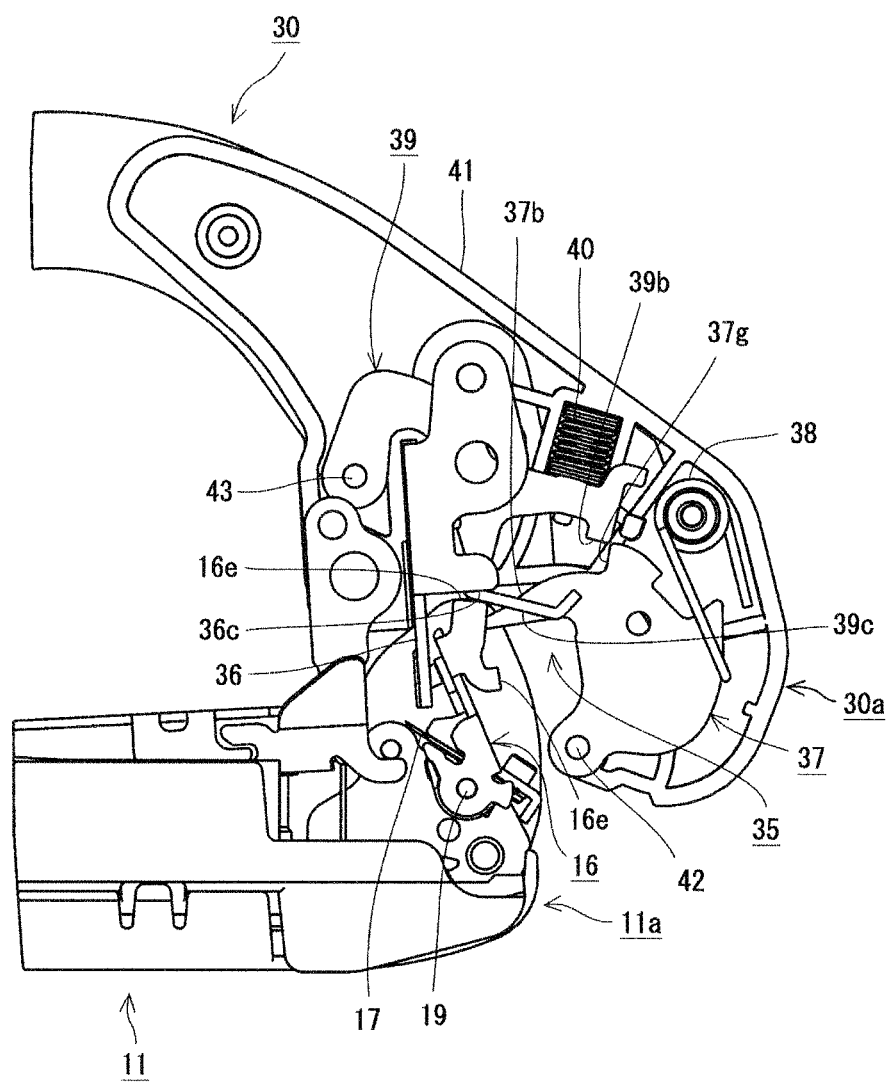
FIG. 15 is a view for explaining the relation between the tape guide and the lock member and the support portion and illustrates a state in which the tape guide pushes up the lock member.

When the clincher arm 30 further rotates, the lock member 39 is pushed up to rotate as illustrated in FIG. 15. As the lock member 39 rotates, the locking portion 39b of the lock member 39 is disengaged from the locked portion 37g of the gripping member 37 and the gripping member 37 rotates. Thus, the claw portion 37b of the gripping member 37 is pressed against the back surface portion 16c of the tape guide 16, and the end 60a of the tape 60 drawn out from the tape guide 16 is gripped in the guide path of the tape guide 16.

Figure 16:
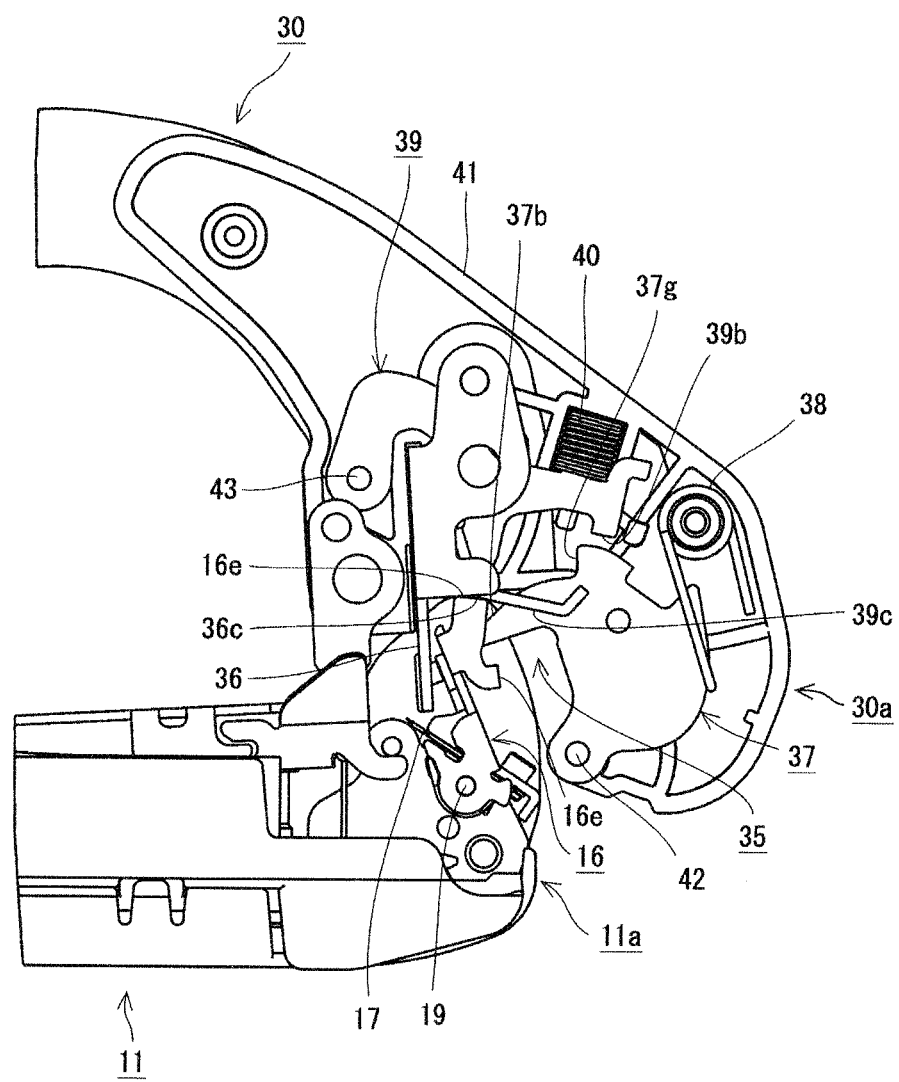
FIG. 16 is a view for explaining the relation between the tape guide and the lock member and the support portion and illustrates a state in which the tape guide abuts on the support portion.

At this time, when the clincher arm 30 further rotates, the tape holding portion 16e of the tape guide 16 comes in contact with the movement restricting portion 36c of the support portion 36 as illustrated in FIG. 16. In this way, the tape guide 16 functions as a movement restricting unit for restricting the rotation of the clincher arm 30 in the embodiment. Thus, the rotation of the clincher arm 30 is restricted, and thus the clincher arm 30 can hardly rotate up to a completely closed state (a closed state in which the binding operation is executed). Whether the tape guide 16 restricts the rotation of the clincher arm 30 is automatically switched according to the state of the tape gripping device 35. That is, when the tape gripping device 35 is in the standby state, the rotation of the clincher arm 30 is restricted as described above, but when the tape gripping device 35 is in the gripping state, the tape guide 16 acts on the tape gripping device 35 (which will be described below in detail), and thus the clincher arm 30 moves up to a position where the rotation thereof is not restricted (see FIG. 21).

Figure 17:
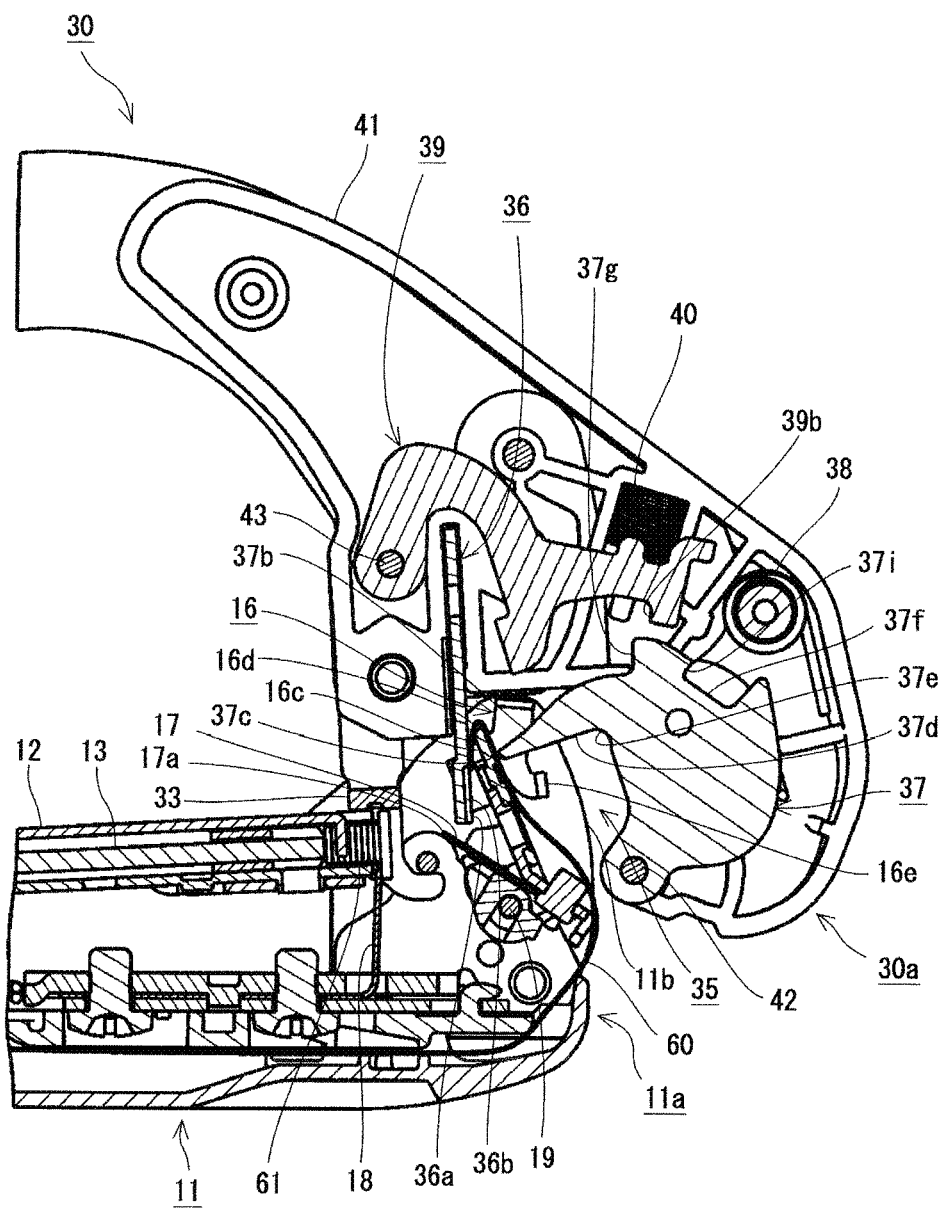
FIG. 17 is a partially enlarged sectional view of the binding machine for gardening and illustrates a state in which the gripping member grips a tape in accordance with the tape guide.

When the first squeezing operation is performed in this way, as illustrated in FIG. 17, the gripping member 37 enters into the guide path of the tape guide 16 and grips the tape 60 in the guide path in accordance with the back surface portion 16c of the tape guide 16. In this state, when the squeezing of the handle is released and the clincher arm 30 rotates in the opening direction with respect to the main handle 11, as illustrated in FIG. 18, the gripping member 37 slides in the guide path in a state of gripping the tape 60 and grips the tape 60 in accordance with the support portion 36 after passing through the guide path.

Further, when the clincher arm 30 rotates in the opening direction with respect to the main handle 11, as illustrated in FIG. 19, the front end portion 30a of the clincher arm 30 and the front end portion 11a of the main handle 11 are separated from each other in a state of gripping the tape 60, and the tape 60 is in a state of being stretched between the clincher arm 30 and the main handle 11.

Figure 20:
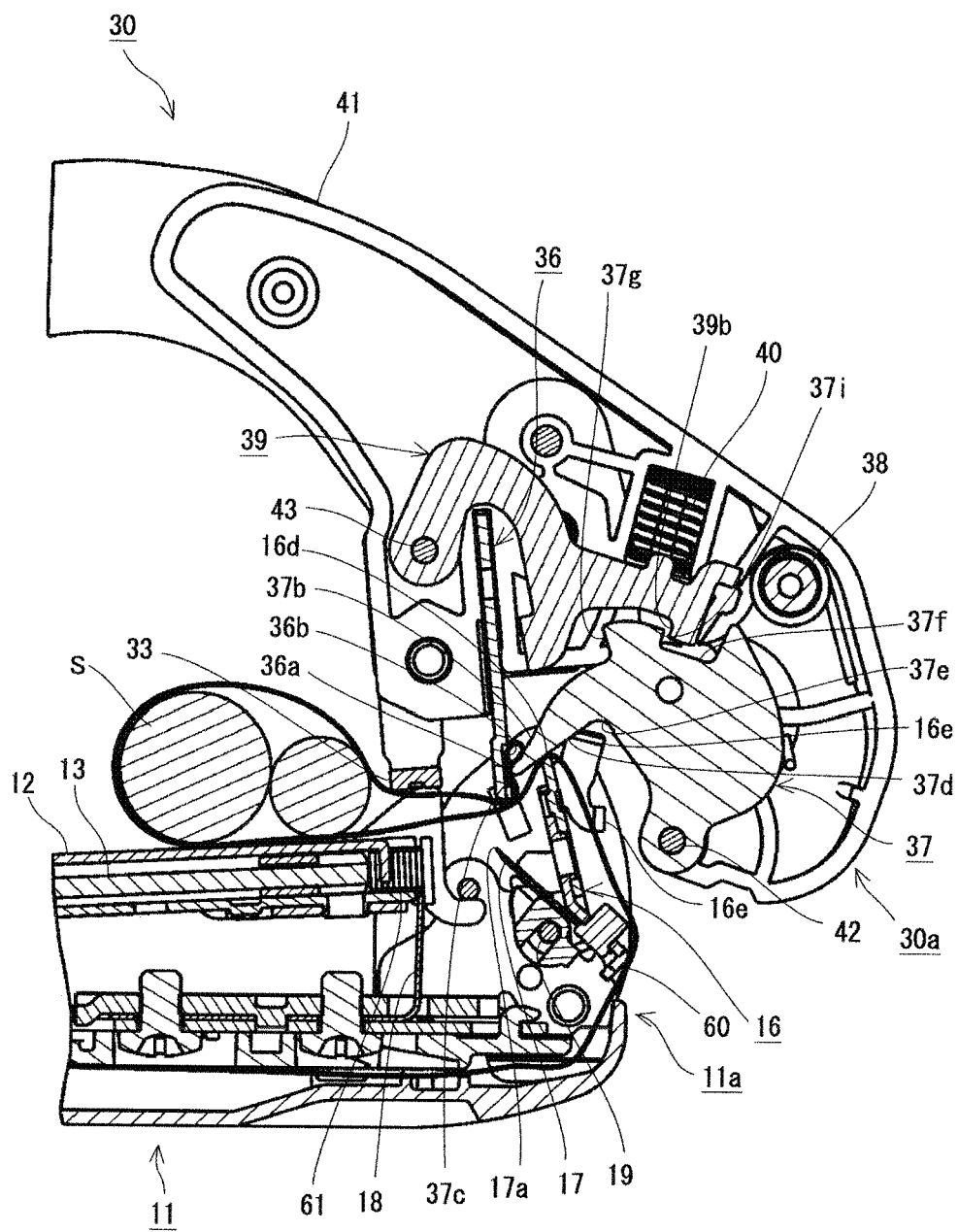
FIG. 20 is a partially enlarged sectional view of the binding machine for gardening and illustrates a state in which the tape guide is in contact with the gripping member.

In this state, when the objects S to be bound such as seedlings or branches are introduced from the outside of the stretched tape 60 and the clincher arm 30 rotates in the closing direction, as illustrated in FIG. 20, a tape loop is formed to bind the objects S to be bound.

From the state illustrated in FIG. 20, when the handle is further gripped and the clincher arm 30 rotates in the closing direction with respect to the main handle 11, the abutment portion 16d of the tape guide 16 abuts on the inclined surface 37d of the gripping member 37, and the abutment portion 16d is guided to the inclined surface 37d of the gripping member 37 and moves forward. As the tape magazine 20 moves forward as described above, the tape guide 16 is retracted to a position where the tape holding portion 16e does not come in contact with the movement restricting portion 36c of the support portion 36. When the tape guide 16 is retracted, the restriction of the rotation of the clincher arm 30 due to the tape guide 16 is released, and the clincher arm 30 is rotatable up to a completely closed state (a closed state where the binding operation is executed). In a state where the tape magazine 20 starts to move, the locking portion 39b of the lock member 39 faces the rotation blocking portion 37i of the gripping member 37, and the movement of the gripping member 37 is restricted.

Figure 21:
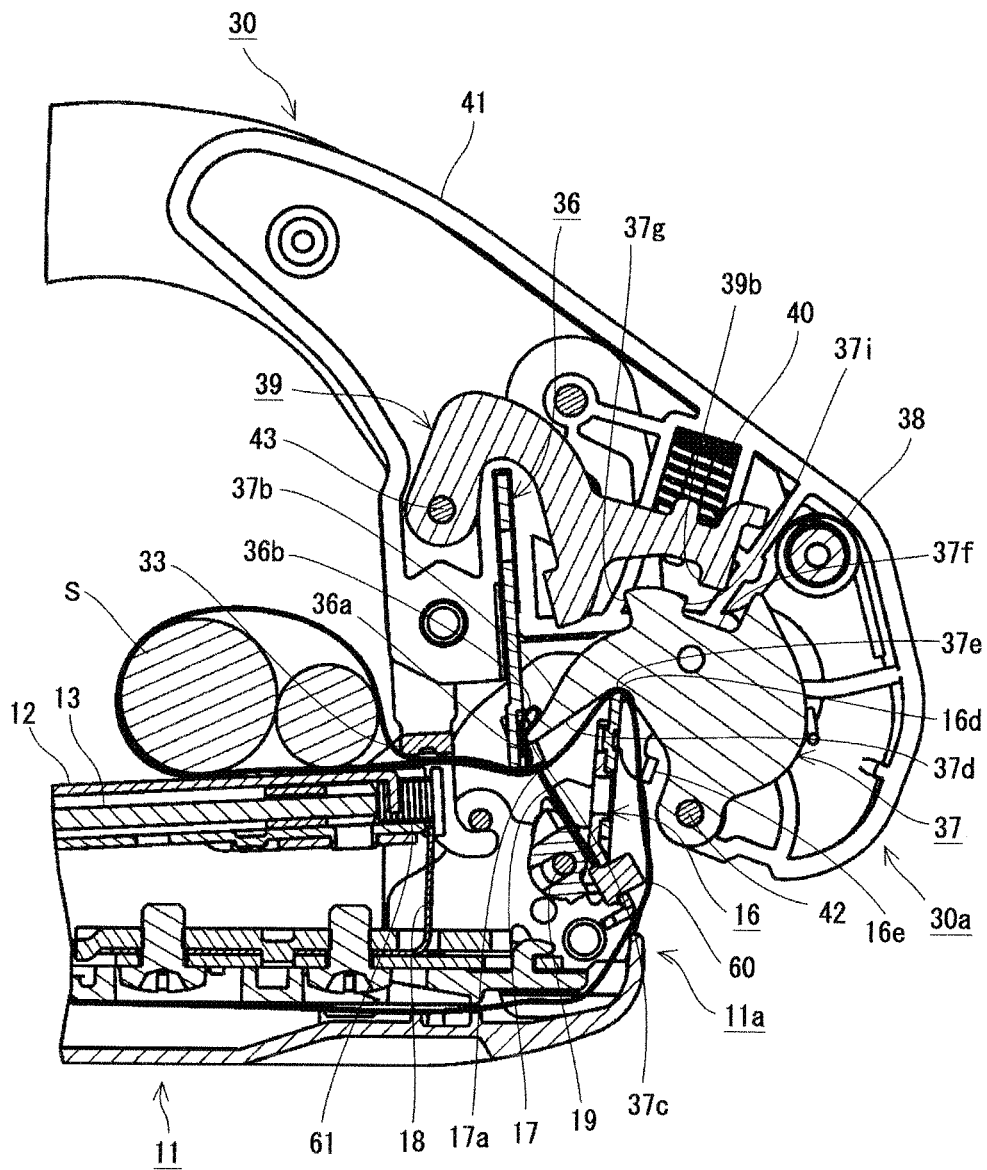
FIG. 21 is a partially enlarged sectional view of the binding machine for gardening and illustrates a state in which the tape guide moves along an inclined surface of the gripping member.

Then, as illustrated in FIG. 21, the tape magazine 20 rocks forward until the abutment portion 16d is engaged with the V-shaped portion 37e ahead of the inclined surface 37d.

When the abutment portion 16d is engaged with the V-shaped portion 37e in this way, the tape guide 16 and the gripping member 37 hold the tape 60 in accordance with each other. Immediately before the abutment portion 16d is engaged with the V-shaped portion 37e, the tape holding portion 16e of the tape magazine 20 pushes up the pressed portion 39c of the lock member 39 to rock the lock member 39. Thus, the movement restriction of the gripping member 37 is released.

From the state illustrated in FIG. 21, when the handle is further gripped and the clincher arm 30 rotates in the closing direction with respect to the main handle 11, as illustrated in FIG. 22, the tape magazine 20 and the gripping member 37 collapse forward together. At this time, since the tape magazine 20 moves while holding the tape 60, tension is applied to the tape 60. As the gripping member 37 moves together with the tape magazine 20, the tape 60 is detached from the tape gripping device 35. However, since the detached tape 60 is pressed from below by the tensioned tape 60, it is not disengaged from the front end portion 30a of the clincher arm 30. Then, as the tape magazine 20 rocks, the cutting blade 17 fixed to the tape magazine 20 rocks in a direction in which the cutting blade 17 approaches the tape 60, and the tensioned tape 60 is cut. At the same time, the staple 61 is ejected behind the cutting blade 17 by the staple driver 18.

As illustrated in FIG. 22, in the course of rotating the clincher arm 30 in the closing direction with respect to the main handle 11, the tape holding portion 16e of the tape magazine 20 is disengaged from the pressed portion 39c of the lock member 39. For this reason, the force pushing up the lock member 39 disappears, so that the lock member 39 moves by the urging force of the lock member urging unit 40, and becomes engageable with the gripping member 37. In addition, the gripping member 37 moves together with the tape magazine 20, and thus moves to the front side compared to the standby state.

Finally, when the squeezing of the handle is released and the clincher arm 30 rotates in the opening direction with respect to the main handle 11, as illustrated in FIG. 12, the gripping member 37 is engaged with the lock member 39 and the tape gripping device 35 is in a standby state. In this way, the binding machine for gardening 10 returns to the initial state, and the first binding work is completed.

As described above, according to the embodiment, the movement restricting unit (tape guide 16) restricts such that the clincher arm 30 does not rotate until being closed when the tape gripping device 35 is in the standby state, and does not restrict the rotation of the clincher arm 30 when the tape gripping device 35 is in the gripping state. According to this configuration, since the movement restricting unit controls such that the handle is excessively gripped at the time of the first squeezing operation of drawing out the tape 60, it is possible to avoid the problem that the tape 60 cannot be successfully gripped due to the excessive squeezing or the insufficient squeezing of the handle. Accordingly, the unfamiliar worker for the binding machine for gardening 10 can also determine the extent to which the handle is gripped in the tape gripping operation. Meanwhile, since the movement of the handle is not restricted at the time of the second squeezing operation in which the binding is completed, when the handle is gripped until the closed state, the bonding or cutting of the tape 60 is performed.

In addition, the movement restricting unit (tape guide 16) is provided movably to interact with the tape gripping device 35, and whether or not to restrict the rotation of the clincher arm 30 is switchable by the movement. According to this configuration, the position of the movement restricting unit is directly changed according to the state (standby state or gripping state) of the tape gripping device 35. Thus, since the presence or absence of restriction is switched, it is possible to control the amount of squeezing by directly determining from the state of the tape gripping device 35 whether the first squeezing operation or the second squeezing operation is performed. Accordingly, it is possible to simply and reliably control the amount of squeezing.

Further, the tape guide 16 functions as the movement restricting unit. According to this configuration, the movement restricting unit is realized without using an additional member. In addition, since the tape 60 can be cut after being sufficiently pulled out by the movement of the tape guide 16, it is possible to cut the tape 60 at a position where a sufficient gripping margin is ensured. When the sufficient gripping margin is ensured, the tape gripping device 35 can reliably grip the tape 60 in the next gripping operation.

In the embodiment described above, the tape 60 is sandwiched and gripped by the tape gripping device 35, but the invention is not limited thereto. For example, even in the mechanism used in the related art in which the claw is thrust into the tape 60 to hold the tape 60, the same effect as this embodiment can be obtained.

In the embodiment described above, the tape guide 16 rocks, but the invention is not limited thereto. For example, the tape guide 16 may linearly move back and forth.

In the embodiment described above, the movement restricting unit is realized using the tape guide 16, but is not limited thereto. The rotation restricting unit may be realized using another member having the same movement as the tape guide 16 according to the embodiment.

(1) A binding machine for gardening comprising:
a main handle that is configured to draw out a tape from a front end portion thereof;
a clincher arm that is rotatably attached to the main handle; and
a tape gripping device that is attached to a front end portion of the clincher arm, wherein
when the clincher arm rotates in a closing direction to a predetermined position with respect to the main handle, a gripping operation is performed in which the tape gripping device grips an end portion of the tape drawn out from the front end portion of the main handle,
when the clincher arm further rotates in the closing direction from the predetermined position with respect to the main handle to be in a closed state, a binding operation is performed in which the tape binds objects to be bound and is then cut,
the gripping operation and the binding operation are performed alternately, to bind the object, and
a movement restricting unit is provided to restrict the rotation of the clincher arm in the closing direction from the predetermined position at the time of the gripping operation.

(2) The binding machine for gardening according to (1), wherein
the movement restricting unit is movably provided to interact with the tape gripping device, and is configured to switch whether or not to restrict the rotation of the clincher arm, by the movement of the movement restricting unit.

(3) The binding machine for gardening according to (1) or (2), further comprising:
a tape guide through which the tape is guided so as to be drawable, at the front end portion of the main handle, wherein
the tape guide is configured to restrict the rotation of the clincher arm as the movement restricting unit.

(4) The binding machine for gardening according to any one of (1) to (3), wherein
the movement restricting unit is configured to restrict the rotation of the clincher arm when the tape gripping device is in a standby state, and is configured not to restrict the rotation of the clincher arm when the tape gripping device is in a gripping state.

(5) The binding machine for gardening according to any one of (1) to (4), wherein
the gripping operation is performed during a first closing rotation of the clincher arm and the binding operation is performed during a second closing rotation of the clincher arm, and
the movement restricting unit is configured to restrict the rotation of the clincher arm after the tape gripping device grips the end portion of the tape during the first closing rotation.

What is claimed is:

1. A binding machine for gardening comprising:
   a main handle that is configured to draw out a tape from a front end portion thereof;
   a clincher arm that is rotatably attached to the main handle; and
   a tape gripping device that is attached to a front end portion of the clincher arm, wherein
   when the clincher arm rotates in a closing direction to a predetermined position with respect to the main handle, a gripping operation is performed in which the tape gripping device grips an end portion of the tape drawn out from the front end portion of the main handle,
   when the clincher arm further rotates in the closing direction from the predetermined position with respect to the main handle to be in a closed state, a binding operation is performed in which the tape binds objects to be bound and is then cut,
   the gripping operation and the binding operation are performed alternately, to bind the object, and
   a movement restricting unit is provided to restrict the rotation of the clincher arm in the closing direction from the predetermined position at the time of the gripping operation.

2. The binding machine for gardening according to claim 1, wherein
   the movement restricting unit is movably provided to interact with the tape gripping device, and is configured to switch whether or not to restrict the rotation of the clincher arm, by the movement of the movement restricting unit.

3. The binding machine for gardening according to claim 1, further comprising:
   a tape guide through which the tape is guided so as to be drawable, at the front end portion of the main handle, wherein
   the tape guide is configured to restrict the rotation of the clincher arm as the movement restricting unit.

4. The binding machine for gardening according to claim 1, wherein
   the movement restricting unit is configured to restrict the rotation of the clincher arm when the tape gripping device is in a standby state, and is configured not to restrict the rotation of the clincher arm when the tape gripping device is in a gripping state.

5. The binding machine for gardening according to claim 1, wherein
   the gripping operation is performed during a first closing rotation of the clincher arm and the binding operation is performed during a second closing rotation of the clincher arm, and
   the movement restricting unit is configured to restrict the rotation of the clincher arm after the tape gripping device grips the end portion of the tape during the first closing rotation.

6. The binding machine for gardening according to claim 4, wherein the clincher arm is movable between an open position and a fully closed position, wherein the predetermined position is a partially closed position between the open position and the fully closed position; and
   wherein when the tape gripping device is in the standby state, the movement restricting unit is positioned to block movement of the clincher arm from the predetermined position to the fully closed position, and wherein when the tape gripping device is in the gripping state the movement restricting unit does not block movement of the clincher arm so that the clincher arm is movable to the fully closed position.

7. The binding machine for gardening according to claim 6, which further includes a tape guide, and wherein the tape guide is configured to restrict the rotation of the clincher arm as the movement restricting unit.

8. The binding for gardening machine for gardening according to claim 7, wherein when the tape gripping device is in the standby state, a portion of the tape guide blocks a portion of the tape gripping device and thereby blocks movement of the clincher arm to the fully closed position.

9. The binding machine for gardening according to claim 3, wherein during the gripping operation, a portion of the tape guide blocks a portion of the tape gripping device and thereby blocks movement of the clincher arm from the predetermined position in a closing direction and preventing the clincher arm from being moved to a fully closed position.

10. The binding machine for gardening according to claim 9, wherein after the gripping operation the tape gripping device is in a gripping state, and in the gripping state the portion of the tape guide does not block the portion of the tape gripping device.

11. The binding machine for gardening according to claim 10, wherein after the gripping operation the clincher arm is configured to rotate in an opening direction stretching the tape between the clincher arm and the main handle at the front end of the clincher arm and the front end of the main handle, and after an object to be bound is introduced to between the main handle and the clincher arm, the clincher arm is configured to rotate to the fully closed position without being restricted by the movement restricting unit and thereby form a loop of the tape around the object.

12. The binding machine for gardening according to claim 1, wherein after the gripping operation the clincher arm is configured to rotate in an opening direction stretching the tape between the clincher arm and the main handle at the front end of the clincher arm and the front end of the main handle, and after an object to be bound is introduced to between the main handle and the clincher arm, the clincher arm is configured to rotate to a fully closed position without being restricted by the movement restricting unit and thereby form a loop of the tape around the object.

* * * * *

UNITED STATES PATENT AND TRADEMARK OFFICE
CERTIFICATE OF CORRECTION

PATENT NO. : 10,548,266 B2
APPLICATION NO. : 15/622253
DATED : February 4, 2020
INVENTOR(S) : Satoshi Taguchi It is certified that error appears in the above-identified patent and that said Letters Patent is hereby corrected as shown below:

In the Specification

Column 12, Line 52, "the tape magazine 20" should read -- the tape guide 16 --.
Column 12, Line 61, "the tape magazine 20" should read -- the tape guide 16 --.
Column 12, Line 65, "the tape magazine 20" should read -- the tape guide 16 --.
Column 13, Line 6, "the tape magazine 20" should read -- the tape guide 16 --.
Column 13, Line 13, "the tape magazine 20" should read -- the tape guide 16 --.
Column 13, Lines 14-15, "the tape magazine 20" should read -- the tape guide 16 --.
Column 13, Line 17, "the tape magazine 20" should read -- the tape guide 16 --.
Column 13, Line 21, "the tape magazine 20" should read -- the tape guide 16 --.
Column 13, Line 22, "the tape magazine 20" should read -- the tape guide 16 --.
Column 13, Lines 29-30, "the tape magazine 20" should read -- the tape guide 16 --.
Column 13, Lines 35-36, "the tape magazine 20" should read -- the tape guide 16 --.

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*